(12) United States Patent
Maehner

(10) Patent No.: US 8,614,740 B2
(45) Date of Patent: *Dec. 24, 2013

(54) DEVICE AND METHOD FOR INSPECTING A TIRE, IN PARTICULAR USING AN INTERFEROMETRIC MEASURING METHOD

(76) Inventor: Bernward Maehner, Gilching (DE)

( * ) Notice: Subject to any disclaimer, the term of this patent is extended or adjusted under 35 U.S.C. 154(b) by 937 days.

This patent is subject to a terminal disclaimer.

(21) Appl. No.: 12/294,721

(22) PCT Filed: Mar. 26, 2007

(86) PCT No.: PCT/EP2007/052882
§ 371 (c)(1), (2), (4) Date: Nov. 25, 2008

(87) PCT Pub. No.: WO2007/110414
PCT Pub. Date: Oct. 4, 2007

(65) Prior Publication Data
US 2010/0013916 A1 Jan. 21, 2010

(30) Foreign Application Priority Data
Mar. 27, 2006 (DE) .......................... 10 2006 014 070

(51) Int. Cl.
*H04N 7/18* (2006.01)
(52) U.S. Cl.
USPC ........................................... 348/125; 73/146
(58) Field of Classification Search
USPC ............................................ 348/125; 73/146
See application file for complete search history.

(56) References Cited

U.S. PATENT DOCUMENTS

| | | | | |
|---|---|---|---|---|
| 4,111,557 A | | 9/1978 | Rottenkolber et al. | |
| 4,258,567 A | * | 3/1981 | Fisher, III | 73/146 |
| 4,969,355 A | * | 11/1990 | Doi et al. | 73/146 |
| 5,485,406 A | | 1/1996 | Wada et al. | |
| 5,836,869 A | * | 11/1998 | Kudo et al. | 600/173 |
| 6,012,329 A | | 1/2000 | Kelm-Klager et al. | |
| 6,041,649 A | | 3/2000 | Fembock | |
| 6,502,453 B1 | * | 1/2003 | Kelm-Klager | 73/146 |
| 2005/0264796 A1 | * | 12/2005 | Shaw et al. | 356/237.2 |
| 2008/0021662 A1 | * | 1/2008 | Hinn | 702/34 |
| 2010/0170331 A1 | * | 7/2010 | Maehner et al. | 73/146 |

FOREIGN PATENT DOCUMENTS

| | | |
|---|---|---|
| DE | 19731486 C2 | 1/1999 |
| EP | 0884560 B1 | 5/1998 |
| EP | 0884574 B1 | 12/1998 |
| EP | 1477765 A1 | 11/2004 |

* cited by examiner

*Primary Examiner* — Duyen Doan
(74) *Attorney, Agent, or Firm* — Brian B. Shaw, Esq.; Thomas B. Ryan; Harter Secrest & Emery LLP

(57) ABSTRACT

A device for inspecting a tire (10), in particular by means of an interferometric measuring method, is provided with a measuring head, which is used to scan the tire in order to produce a measured result. The device is also equipped with a location element, which allows the measuring head to be located and aligned in a monitoring position. In addition, the device is provided with a control and display unit, which allows the location element to be controlled and the measured result to be displayed. To achieve the simple control of the measuring head and a reliable evaluation of the measured result, the control and display unit has at least one display field for displaying the monitoring position or the monitoring direction of the measuring head in relation to the tire.

48 Claims, 18 Drawing Sheets

DEVICE AND METHOD FOR INSPECTING A TIRE, IN PARTICULAR USING AN INTERFEROMETRIC MEASURING METHOD

The invention relates to a device for testing a tire, particularly by interferometric scanning. The device is provided with a scanning head for scanning the tires to obtain a resulting scan. The device is further provided with a positioning means for positioning the scanning head in a viewing position and orienting it in a viewing direction. With the aid of a control and display means the positioning means is controllable and the resulting scan displayable. The invention relates furthermore to a method for testing a tire in which such a device can find application.

Tires are subjected to material testing for quality inspection and to reduce safety risks, making it possible to recognize faulty locations, so-called flaws. It is particularly in the case of used tires to be retreaded that as a rule non-destructive material testing is done ensuring a relatively fast series inspection. Often employed in industry for this purpose are optical methods of sensing such as, for example, holography or shearography also termed speckle pattern shearing interferometry, shearography is a relative interferometric sensing method which furnishes an image as the result showing the difference between two conditions of the test object staggered in time. To image the result, nowadays as a rule digitally, due to the increasing popularity of electronic image sensors, such as, for example, CCD sensors, it has thus become necessary to tweak the condition of the test object between two scannings by making use of a mechanical, thermal or pneumatic force. Known, for instance, from German patent DE 199 44 314 A1 are testers which for this reason comprise a pressure chamber which is either pressurized or evacuated so that the tire located in the pressure chamber is deformed due to the change in pressure in thus being transformed from a first reference condition into a second scanned condition.

Unlike holography, shearography does not map the surface deformation of a test object but the gradients of the deformation. This is because shearography employs a so-called shearing element which is a shearoptic assembly, such as, for example, an optical wedge, an optical biprism or a Michelson interferometer generating image doubling, i.e. two images of the test object slightly staggered spatially which are overlayed to produce an interferogram due to the resulting interference. The shearogram characterizing the gradients of the deformation is generated by subtracting the intensities of the interferograms obtained in the reference condition and in the scanned condition, the shearogram indicating whether there has been a change in the location of a point to an adjoining point because of deformation of the test object. If so, this difference in the distance results in a local change in the distribution of the intensity, providing information as to a flaw. Interferometric scanning based on speckle interferometry are described in DE 42 31 578 A1 and EP 1 014 036 B1.

A tire testing apparatus in which a tire to be tested is arranged without rim and disc in a lying position in a pressure chamber is disclosed in German patent DE 199 44 314 A1. This tire testing apparatus features an adjustable scanning head which can be positioned at a predefined distance away from the inner circumferential surface, the inner side surface and the outer side surface of the tire to test the carcass, a belting often sandwiched between the carcass and the tread as well as the sidewall of the tire. The scanning head features a plurality of illuminator and imaging assemblies which simultaneously test differing sections of the tire for relatively fast testing.

The imaging assembly of the scanning head is usually a camera featuring a light-sensitive semiconductor sensor, for example a CCD or CMOS sensor. To obtain an informative resulting scan it is necessary that that the field of view of the camera and the section of the tire to be tested are made to conform. This is usually done by the scanning head being positioned in a viewing position and oriented in a viewing direction to ensure, for one thing, that the selected section of the tire scanned is totally in the field of view of the camera, and for another, so that the sections in sequence adequately overlap to achieve gapless scanning. The viewing position and viewing direction of the scanning head depend on the dimensions of the tire tyre. Known from EP 1 284 409 A1 and DE 103 33 802 A1 are thus devices to make it possible to scan the tire optically, for example, by means of so-called light slices so as to position and orient the scanning head as a function of the data obtained in this way. The drawback here is the added expense of the hardware needed for scanning the tire tyre.

It is particularly when tires of a certain type are put through series testing that it is mostly sufficient to save the dimensions of the tire specific to the type thereof and the parameters of the scanning head assigned thereto in a test routine loaded for testing each type of tire concerned in a memory of the control and display means. Although the parameters of the scanning head, i.e. the viewing position and viewing direction need to be defined once only for a certain type of tire, they depend on a reference system determined by the positioning means of the testing device. It is thus impossible to use the test routines specific to the tires concerned for any testing device having different positioning means.

On top of this, knowing the parameters of the scanning head is, as a rule, vital for analyzing the results of testing. For, when the result is, for example, an image showing interference lines or phase difference angles between two conditions of the tested tire staggered in time, as is known, for example, from EP 1 014 036 B1, then the image of the result in most cases furnishes the viewer no indications as to the spatial location of the test section assigned to the resulting image and thus as to a flaw illustrated therein.

The invention is based on the object of providing a device and a method for testing a tire sophisticated by simple control of the scanning head and reliable analysis of the resulting scan.

This object is achieved by a device as set forth in claim 1 and by a method as set forth in 25. Preferred aspects of the device and of the method read from the claims 2 to 24 and from 26 to 46 respectively.

The device in accordance with the invention for testing a tire is provided with a scanning head for scanning the tire to obtain a resulting scan. The scanning head may be configured as described in EP 1 014 036 B1 for testing the tire by means of an interferometric scanning method. The device in accordance with the invention is provided furthermore with means for positioning the scanning head in a viewing position and orientation in a viewing direction. With the aid of a control and display means the positioning means having for example two degrees of translational and rotational freedom are controlled and the resulting scan, existing for instance as a scan image, displayed. The control and display means comprises at least one display field for displaying the viewing position and/or the viewing direction of the scanning head relative to the tire.

The method in accordance with the invention for testing a tire comprises the following steps:

a) positioning a scanning head by means of a positioning means in a viewing position and orienting it in a viewing direction;

b) scanning the tire by means of the scanning head to produce a resulting scan and c) controlling the positioning means and displaying the resulting scan by means of a control and display means d) displaying the viewing position or the viewing direction of the scanning head by means of at least one display field of the control and display means.

The invention is based on having discovered that displaying the spatial position of the scanning head, i.e. the viewing position and/or the viewing direction relative to the tire by means of the control and display means substantially facilitates, for one thing, maneuvering the scanning head manually controlled, for example when producing a resulting scan, it, for another, simplifying analysis of the resulting scan since the spatial position of the portion of the tire relative to the resulting scan can now be conveniently deduced from the display of the viewing position and/or the viewing direction of the scanning head relative to the tire.

Preferably the scanning head is provided with a camera with a field of view. The camera expediently featuring a light-sensitive semiconductor sensor makes it possible to generate digital scan images which are simple to archive and lend themselves to all forms of analysis, for example, phase shift analysis. It is of advantage when the field of view and/or an angle of view characterizing the field of view is displayed relative to the tire in the display field.

In one preferred aspect of the invention the control and display means comprises a first display field for displaying the viewing position and/or the viewing direction of the scanning head relative to a cross-section through the tire. Such a display field holds good, for example, when the scanning head scans the inner circumferential surface of the tire in being especially suitable to display the angle of view of the scanning head.

In another preferred aspect of the invention the control and display means features a second display field for displaying the viewing position and/or the viewing direction of the scanning head relative to a top-down view of the tire. When, for example, the inner circumferential surface of the tire is tested, involving scanning both the belted portion of the tire and the bead of the tire located in the transition from the tread to the sidewall, in what is called a crown shot, or when the sidewall of the tire is tested, then the second display field additionally makes it possible to display the field of view of the scanning head and thus the portion of the tire to be tested.

In yet another preferred aspect of the invention the control and display means features a third display field for displaying the field of view of the scanning head relative to a segment of the tire. The segment of the tire is to advantage the portion of the inner circumferential surface of the tire facing away from the tread which in general is strengthened by a belting so that the third display field is particularly suitable to display the field of view for a crown shot. When the tire is scanned from without, however, the segment comprises to advantage the outer circumferential surface of the tire.

Preferably the control and display means features an entry field for entering a number of sectors sectioning the tire into discrete scan sections. Preferably the number of sectors is displayable in a separate display field, it being particularly of advantage to display the sectors in the second display field and/or in the third display field to make the size of the sectors evident as compared to the size of the field of view or angle of view. The absolute size of the sectors and thus of the field of view or angle of view of the scanning head is easy to establish when to advantage the angle includes the sectors or the arc length corresponding to the angle is displayed in the second display field and/or in the third display field. In the latter case the arc length is stated expediently relative to the outer diameter of the tire to ensure handling in keeping with good practice.

In another preferred aspect of the device in accordance with the invention the scanning head is moveable by the positioning means in an axial direction and/or in a radial direction. In addition, the scanning head and the tire are rotatable by the positioning means each relative to the other about a rolling axis extending in the axial direction. The positioning means may furthermore serve to rotate the scanning head about a pivoting axis oriented orthogonal to the rolling axis.

Preferably the positioning means comprises a first positioner for moving the scanning head in the axial direction, and/or a second positioner for moving the scanning head in the radial direction, and/or a third positioner for rotating the scanning head and tire relative to each other about the rolling axis, and/or a fourth positioner for rotating the scanning head about a pivoting axis oriented orthogonal to the rolling axis. The first positioner and a second positioner permit translational motion of the scanning head in, for example, the horizontal and vertical direction. The third positioner and fourth positioner permit rotational motion of the scanning head relative to the tire. When the device in accordance with the invention features all four of these positioners, then the positioning means, features two translational and two rotational degrees of freedom ensuring exact positioning and orientation of the scanning head. Depending on the application the positioning means may comprise fewer than, or also more than four positioners. In addition to this it is possible to replace the first positioner and/or the second positioner by a positioner which endows the positioning means, not with a translational degree of freedom but a further rotational degree of freedom.

Expediently the control and display means comprises at least one user field for controlling the first positioner and/or the second positioner and/or the third positioner and/or the fourth positioner.

Preferably the control and display means comprises at least one display field for displaying the spatial offset of the scanning head in the axial direction (axial offset) or the spatial offset of the scanning head in the radial direction (radial offset) and/or the angle of rotation of the scanning head relative to the tire and/or the angle of inclination caused by pivoting the scanning head about the pivoting axis. Where necessary, the display field may double as a user field making it possible to enter the spatial location of the scanning head.

In this context it has been discovered to be particularly an advantage to display and/or enter the spatial offset of the scanning head in the axial direction and/or the spatial offset of the scanning head in the radial direction by means of coordinates of a system of coordinates, the origin of which is located in the intersection of the rolling axis and a tire centerplane. A tire centerplane in this sense is understood to be the plane extending through the middle of the tire axially. When, as in most cases, the tire has a symmetrical configuration then its centerplane corresponds to the plane of symmetry. But when the tire has a non-symmetrical configuration, as is sometimes the case with aircraft tires, or as described in German patent DE 199 44 314 A1 the tire is tested lying and its sidewall on which the tire lies is deformed by the weight of the tire to a degree which cannot be ignored, then the centerplane of the tire is expediently the plane passing through the middle of the rim width of the tire axially. A system of coordinates, the origin of which is located in the intersection of the rolling axis, i.e. the axis about which the tire usually rotates, and the tire centerplane offers the advantage that the spatial offset of the scanning head in the axial direction and in the radial direction is independent of the configuration of the positioning means and the location of the tire in testing. The coordinates characterize the viewing position of the scanning head in this way in a universal reference system rendering the scans obtained by means of different testing devices comparable and the test routines for generating the scans produced by means of different test devices interchangeable.

It is an advantage when the angle of rotation of the scanning head is displayed and/or entered relative to a predefined marking of the tire which may be the DOT number, an identification marking code used as a rule on the tire indicating the production date along with further data as to maximum handling capacity, maximum permissible inflation pressure as well as the cord plies used for carcass and belting. The marking of the tire may also involve, however, a marking applied specifically for testing the tire or some other marking.

Preferably the control and display means comprises a display field for displaying the image taken by the camera, this video image functioning mainly as an orientation aid, especially when the scanning head is maneuvered by manual control.

In a preferred aspect of the invention the resulting scan is represented by at least one scan image. The control and display means in this case features at least one display field for displaying the scan image which may be, for example, an interferogram, a shearogram characterizing the gradients of the deformation at the surface of the tire tested, a phase image or a phase difference image as is known from EP 1 014 036 B1. In this context it has been discovered to be an advantage when the control and display means features a display field for displaying a series of scan images obtained during a full rotation of the scanning head relative to the tire in the corresponding sectors. Accordingly, with the aid of such a display field a scan can be displayed. It is usually the case that three scans are performed for completely testing the tire. By means of the first scan the inner circumferential surface of the tire (crown shot) is tested. When the tire is tested lying then by means of the second scan the sidewall initially laying on top (sidewall shot) is tested. The sidewall initially lying at the bottom and then on top, after the tire is flipped over, is tested in conclusion by means of a third scan (sidewall shot). The display field can display a single scan or two or more scans.

It is furthermore of advantage when the control and display means comprises a display field for displaying a series of scan images obtained in the corresponding sectors of a predefined detail. With the aid of such a display field all scan images of a single scan or also a plurality of scans can be displayed obtained in the sectors located in a detail of, for example, 30° to 135° as measured from a predefined zero, for example of the DOT number. Expediently the control and display means features furthermore a display field for displaying the selected detail relative to a top-down view of the tire. Depending on the application concerned such a display field may double as a user field for selecting the wanted detail.

In a preferred aspect of the invention the control and display means comprises at least a display field assigned to the scan image for displaying the viewing position or viewing direction which the scanning head has in generating the scan image. Such a display field may double as a user field for selecting a wanted scan.

Preferably the location of a detected flaw in the tire is displayed in at least one of the display fields to facilitate locating the flaw when verifying the resulting scan. The location of the flaw is expediently displayed as an arc length at the outer diameter of the tire to facilitate locating the flaw or some other unusual feature by checking the tire. To document the resulting scan it is of advantage when the control and display means comprises a user field by means of which a test report documenting the resulting scan is generated.

The control and display means comprises expediently a computer, an input device for the input and user fields of the control and display means and a monitor for the display fields of the control and display means. The input device may be, for example, a keyboard, a mouse or a touchscreen. The control and display means may be sited spatially separate from the scanning head and the positioning means and, for example, may be connected thereto by the Internet.

To perform interferometric scanning the scanning head comprises to advantage an illuminator for illuminating the testing device, and a shearing element by which the light beams reflected from the tire is caused to become an interference pattern, and a camera provided with an objective lens arranged to receive the interference light beams in the beam path of the shearing element.

Details and further advantages of the invention read from the following description of preferred example aspects. In the drawings illustrating the example aspects simply diagrammatically:

FIG. 2b is a top-down view of the device and tire as shown in FIG. 2a;

Figure 1:
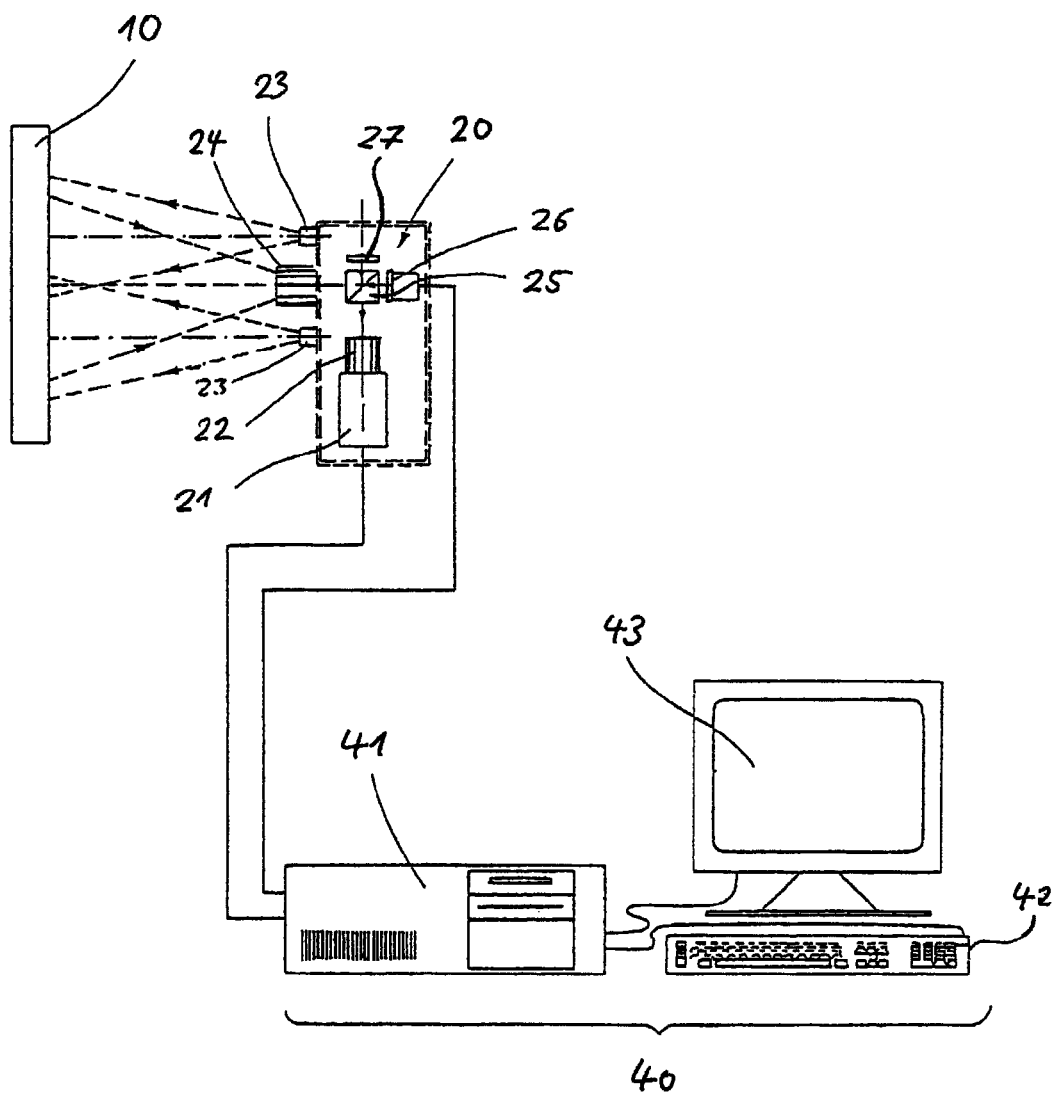
FIG. 1 is a diagrammatic illustration of the scanning head and the control and display means of a device for testing a tire.
Figure 2A:
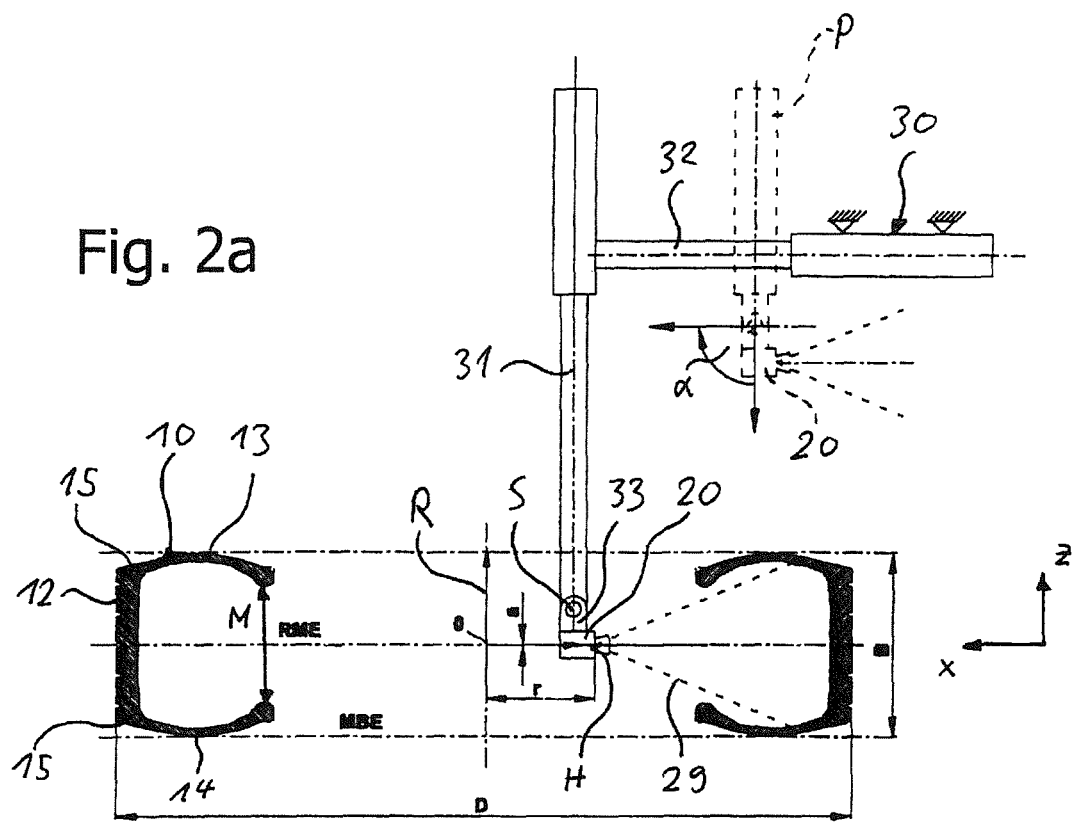
FIG. 2a is a diagrammatic illustration of a positioning means of the device as shown in FIG. 1 and a cross-section through a tire to be tested by the device as shown in FIG. 1.
Figure 2B:
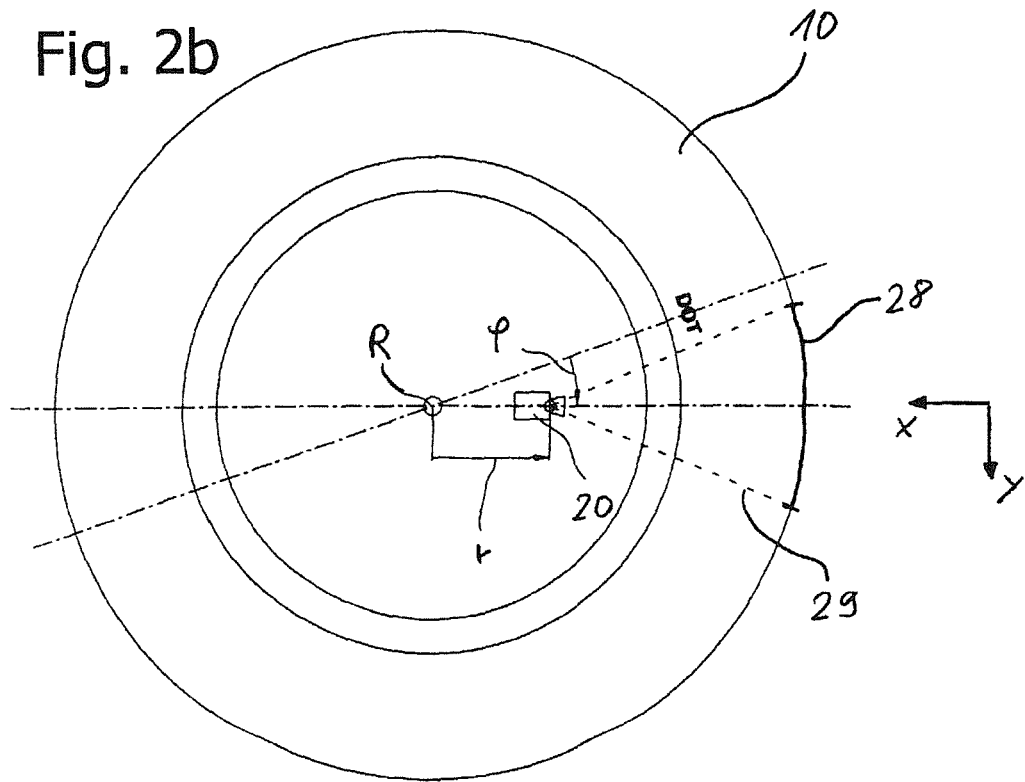

Referring now to FIG. 1 there is illustrated the device for testing a tire 10 by interferometric scanning which as evident furthermore from FIGS. 2a, 2b comprises for this purpose a scanning head 20, a positioning means 30 for positioning the scanning head 20 into a viewing position and orienting the scanning head 20 in a viewing direction, and a control and display means 40. To test the tire 10 in two different conditions of deformation the tire 10 may be located in a pressure chamber (not shown) as described for example in German patent DE 199 44 314 A1. The various deformation conditions of the tire 10 must not be automatically prompted by a change in pressure in the pressure chamber but can be generated by any suitable ways and means.

As evident furthermore from FIG. 1 the scanning head 20 comprises a camera 21 provided with an objective lens 22 and a semiconductor sensor (not shown) for example a CCD or CMOS sensor, a plurality of laser diodes 23 functioning as an illuminator and a shearing element consisting of a beam splitter 25, a moveable mirror 26 and a stationary mirror 27. By means of the laser diodes 23 emitting coherent light the tire 10 is illuminated. The light beams reflected from the surface of the tire 10 are received by means of the objective lens 24 and imaged on the shearing element 25, 26, 27 as well as being brought to interference with the aid thereof. The interference light beams are received by means of the objective lens 22 arranged in the beam path of the shearing element 25, 26, 27 as an interferogram and supplied to the semiconductor sensor which processes the interferogram electronically.

The data generated by the electronic processing is passed on to the control and display means 40. The control and display means 40 comprises a computer 41 by means of which the data is saved and processed, an input device 42 in the form of a keyboard and a mouse (not shown) as well as a monitor 43 which depending on the application involved may be configured as a touchscreen in thus constituting an alternative or additional input device.

The control and display means 40 serves, for one thing, to display the resulting scan in the form of images generated by the scanning head 20 by scanning the tire 10. For another, the control and display means 40 has the function of controlling the positioning means 30 to position the scanning head 20 in a viewing position and to orient it in an viewing direction. As evident particularly from FIGS. 2a and 2b the positioning means 30 comprises a first positioner 31 for moving the scanning head 20 in an axial direction z of the tire 10. When the tire 10 is tested lying, the axial direction z is oriented vertical. The positioning means 30 comprises furthermore a second positioner 32 for moving the scanning head 20 in a radial direction x of the tire 10. The radial direction x is oriented horizontal when the tire 10 is tested lying. In addition, the positioning means 30 comprises a third positioner (not shown) for rotating the scanning head 20 and the tire 10 relative to each other about a rolling axis R extending in the axial direction z. The third positioner may be realized, for example, as a turntable on which the tire 10 is located lying. The positioning means 30 comprises in conclusion a fourth positioner 33 for rotating the scanning head 20 about a pivoting axis S oriented orthogonal to the rolling axis R.

The spatial offset a of the scanning head 20 in the axial direction z produced by the first positioner 31 and the spatial offset r of the scanning head 20 in the radial direction x produced by the second positioner 32 are relative to the main point H of the imaging optic assembly 24 of the scanning head 20 and in a system of coordinates, the origin 0 of which is located at the intersection of the roll axis R and a centerplane of the tire RME. As evident from FIGS. 2a and 2b the roll axis R passes through the centerpoint of the tire 10, as a result of which the spacing of the roll axis R from the tread 12 of the tire 10 amounts to half the diameter D of the tire 10. The centerplane of the tire RME extends in the axial direction z in the middle of rim width M of the tire 10. When the tire 10 has a symmetrical configuration the centerplane of the tire RME simultaneously extends through the middle of the width B of the tire 10 as shown in FIG. 2a. When the tire 10 is tested positioned lying and thus the sidewall 14 of the tire 10 is at the machine basic plane MBE then it may happen, especially where a relatively heavy tires 10 are involved, that the sidewall 14 is deformed by the weight of the tire 10 to an extent which can no longer be ignored. When this happens the middle of the rim width M and the middle of the width B1 measured in the unloaded condition of the tire 10 fall apart. To attain comparable results in testing, the tire centerplane RME defining the origin 0 then extends in the middle of the rim width M or through the crown of the tire 10. As an alternative in such a case the origin 0 of the system of coordinates can be placed in the intersection between the roll axis R and the machine basic plane MBE, the latter also being useful when the dimensions of the width B and rim width M of the tire 10 as well as the location of the crown of the tire 10 are unknown.

As is particularly evident from FIG. 2b there is illustrated how the angle of rotation f of the scanning head 20 prompted by the third positioner extends relative to the tire 10 in the tire centerplane RME. The apex of the angle of rotation f lies in the origin 0 of the system of coordinates, one leg of the angle of rotation f corresponding to a coordinate axis of the system of coordinates passing expediently through a selected marking of the tire 10 which in this case is the DOT number indicating, among other things, the production date of the tire 10. The angle of inclination a resulting from rotation of the scanning head 20 prompted by the fourth positioner 33 about the pivot axis S is referenced relative to a plane in which the roll axis R is located and is rotated in the circumferential direction of the tire 10 from the 0° position by the angle of rotation f, resulting in the pivot axis S being parallel to the tangent at the tire 10 in the corresponding viewing position.

Referring now to FIGS. 2a and 2b there is illustrated furthermore how the image detail scanned by the scanning head 20 is defined by the field of view 28 and the angle of view 29. The angle of view 29 is twice the value of the angle formed by a beam belonging to the edge of the field of view 28 with the optical axis of the objective lens 24.

Referring now to FIGS. 3 to 8 there is illustrated a first user interface of the control and display means 40 which in the present case is a graphics user surface displayed on the monitor 43. The user interface comprises a display field 44 for displaying the viewing position and viewing direction of the scanning head 20 relative to a cross-section through the tire 10. The viewing direction is represented by an arrow, the tip of which symbolizes the main point H of the objective lens 24 and thus the viewing position of the scanning head 20.

The tire 10 is displayed true to scale as regards the diameter D, the width W and the cross-sectional ratio of height to with of the cross-section of the tire. The image detail scanned by the scanning head 20 is rendered visible by the angle of view 29, imaging the tire 10 true to scale also resulting in the image detail defined by the angle of view 29 likewise being true to scale.

The user interface comprises furthermore a display field 45 for displaying the viewing position and the viewing direction of the scanning head 20 relative to a top-down view of the tire 10. Here again, the viewing direction is represented by an arrow, the tip of which indicates the main point H of the objective lens 24 and thus the viewing position of the scanning head 20. The tire 10 is displayed true to scale a regards the diameter D and the cross-sectional ratio. Evident furthermore in the display field 45 are the sectors sectioning the tire 10 into scan sections extending circumferentially. The size of the sectors is rendered visible by the indication of the angle including the sectors in each case.

Indication of the angle is clockwise, simultaneously illustrating the sequence of the sectors along the circumference of the tire 10. Displayed in addition, in the display field 45 is the field of view 28 when the scanning head 20 is directed at least part of the sidewall 13, 14, particularly at the bead 15 of the tire 10. The field of view 28 is expediently highlighted by a contrasting color.

In addition, the user interface features a display field 46 for displaying a segment of the tire 10 in a flat top-down view, the segment comprising the part of the inner circumferential surface of the tire 10 facing away from the tread 12, the display field 46 displaying the sectors and the field of view 28. The number of sectors can be entered by means of a entry field 47 and is displayed in a display field 48. Depending on the application concerned the display field 48 may also be configured for directly entering the number of sectors.

The user interface features furthermore a plurality of user fields 50 to 57 serving to control the scanning head 20. By means of the user fields 51, 50 the axial offset a and radial offset r can be set. By means of the user field 52 the scanning head 20 can be returned to the origin 0 of the system of coordinates. By means of the user fields 53, 54 the angle of inclination a can be set. The angle of rotation f can be set by means of the user fields 55, 56. The user field 57 serves to park the scanning head 20 in location P outside of the tire 10 and is accessed, for example, for servicing or changing the tire 10. The axial offset a, radial offset r, angle of inclination a and angle of rotation f are displayed with the aid of display fields 58, 59, 60, 61 which depending on the particular application concerned also permit direct entry of the corresponding values.

In addition to display, entry and user fields 44 to 48, 50 to 61 serving primarily to control the scanning head 20, the user interface features in addition, a display field 49 for displaying the video image captured by the camera 21. The display field 49 permits a visual feedback contributing towards orientation when controlling the scanning head 20.

Figure 3:
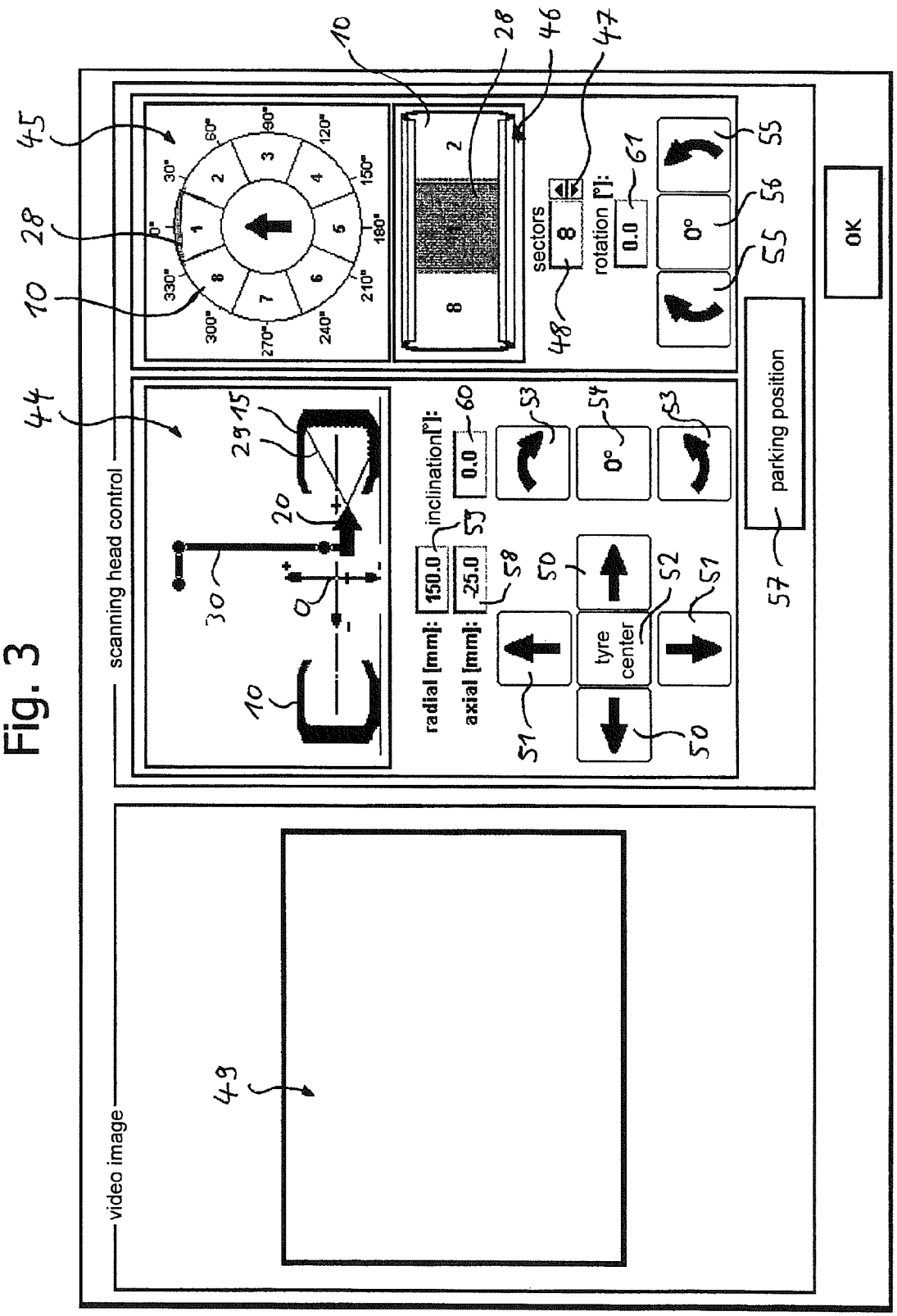
FIG. 3 is an illustration of the control and display means as shown in FIG. 1, showing the scanning head in a first viewing position.

Referring now to FIG. 3 there is illustrated the scanning head 20 in a viewing position in which the axial offset a is −25.0 mm, the spatial offset r 150 mm and the angle of inclination a and angle of rotation f each amounting to 0°. The viewing direction of the scanning head 20 is oriented for a crown shot. The display fields 44, 45 make it evident that the upper bead 15 of the tire 10 is not fully located in the scan of the scanning head 20. The display fields 45, 48 make it evident that the scanning head 20 is oriented at the first sector. In addition, the third display field 46 makes it evident that the first sector is totally located in the field of view 28.

Figure 4:
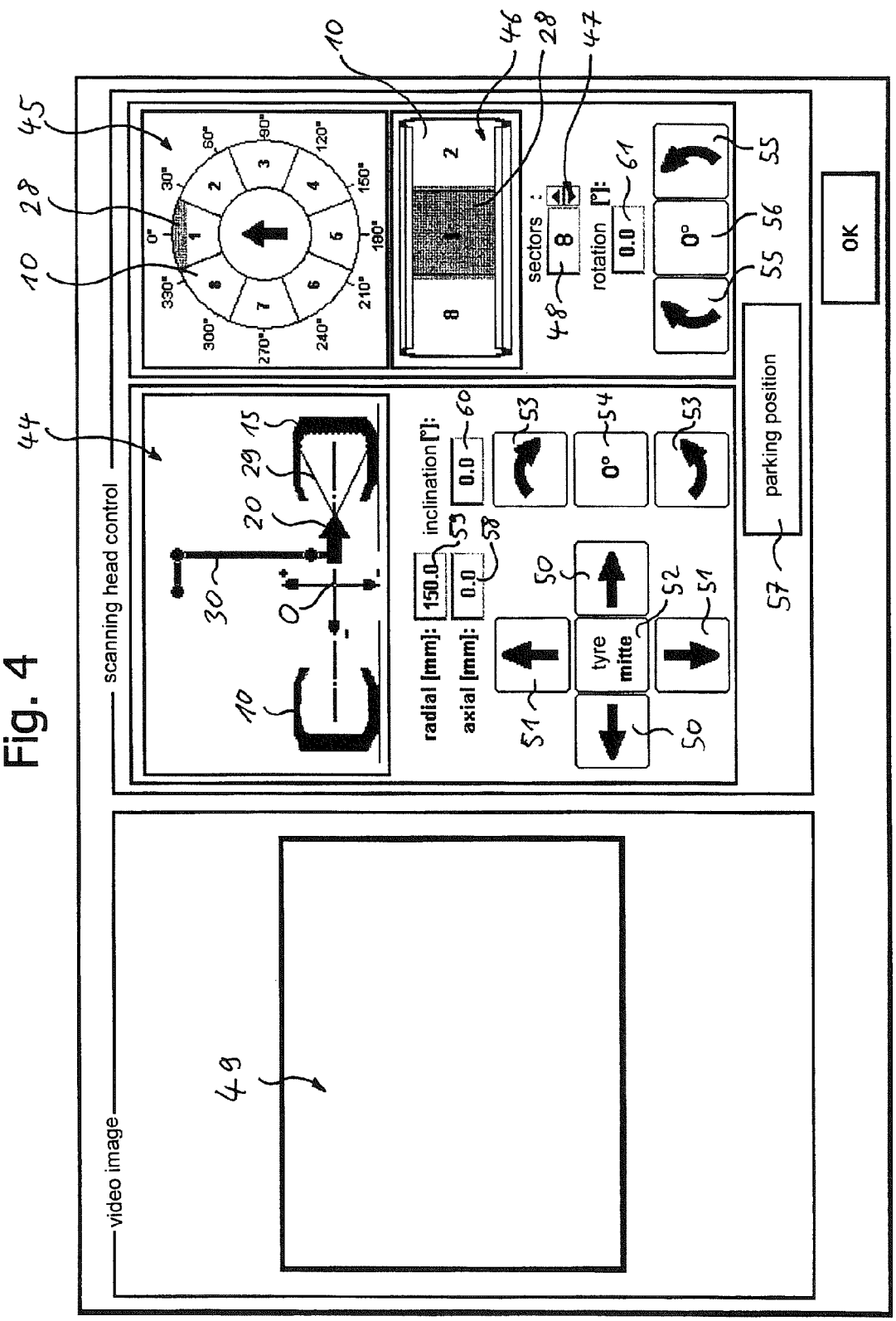
FIG. 4 is an illustration as shown in FIG. 3 showing the scanning head in a second viewing position.
Figure 5:
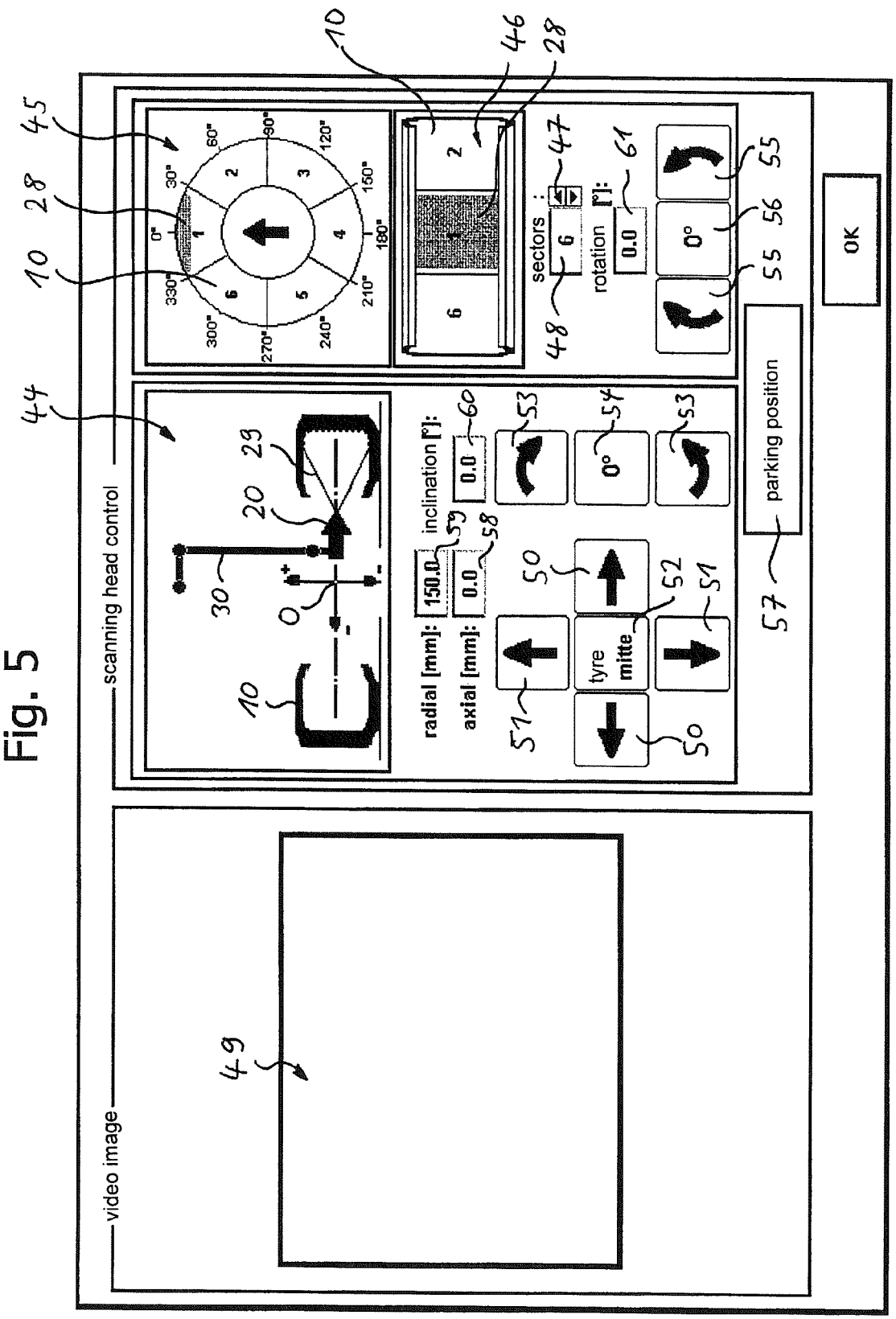
FIG. 5 is an illustration as shown in FIG. 4 showing a resulting scan sectioned into six sectors.
Figure 6:
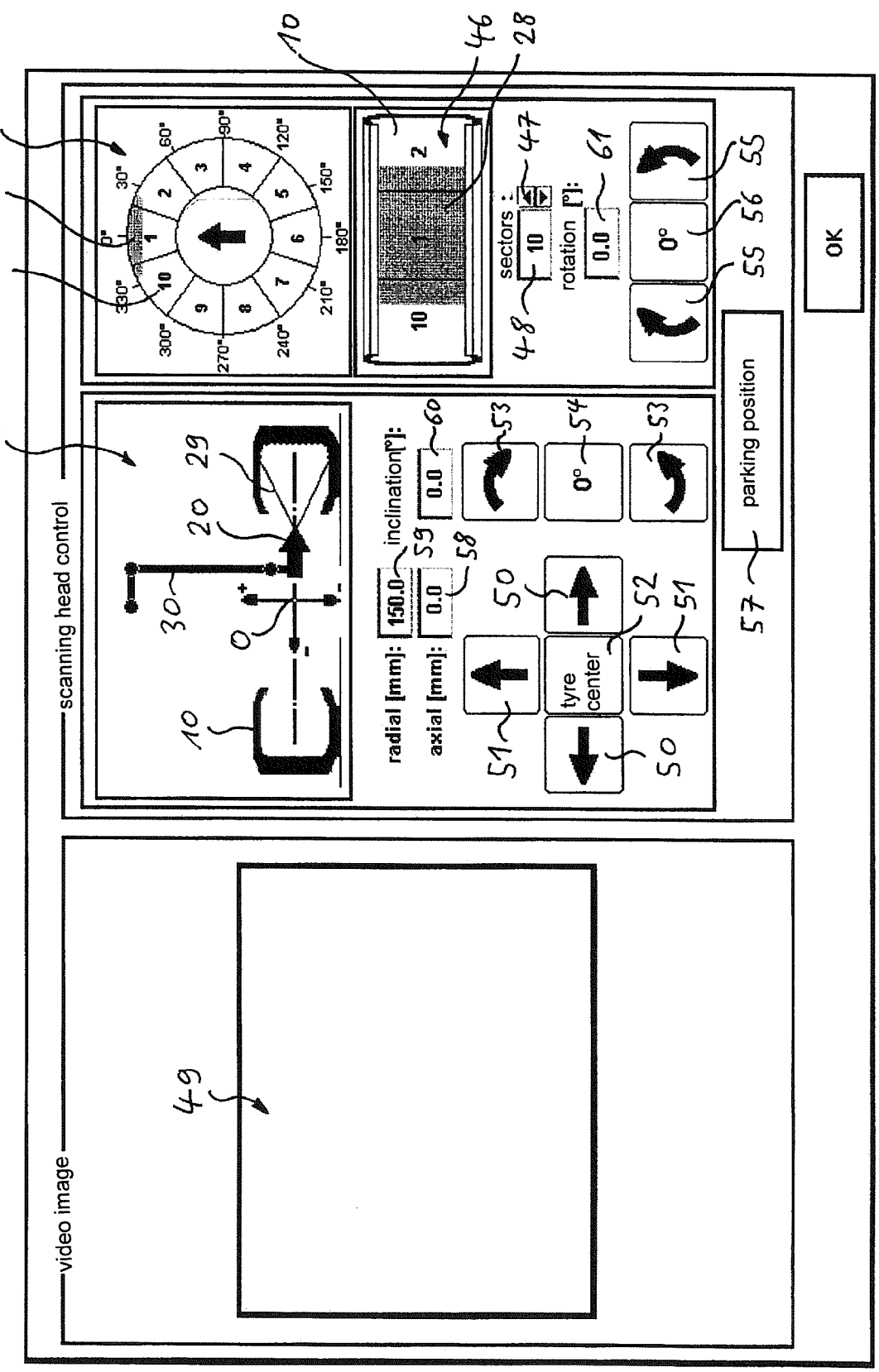
FIG. 6 is an illustration as shown in FIG. 5 showing a resulting scan sectioned into ten sectors.
Figure 7:
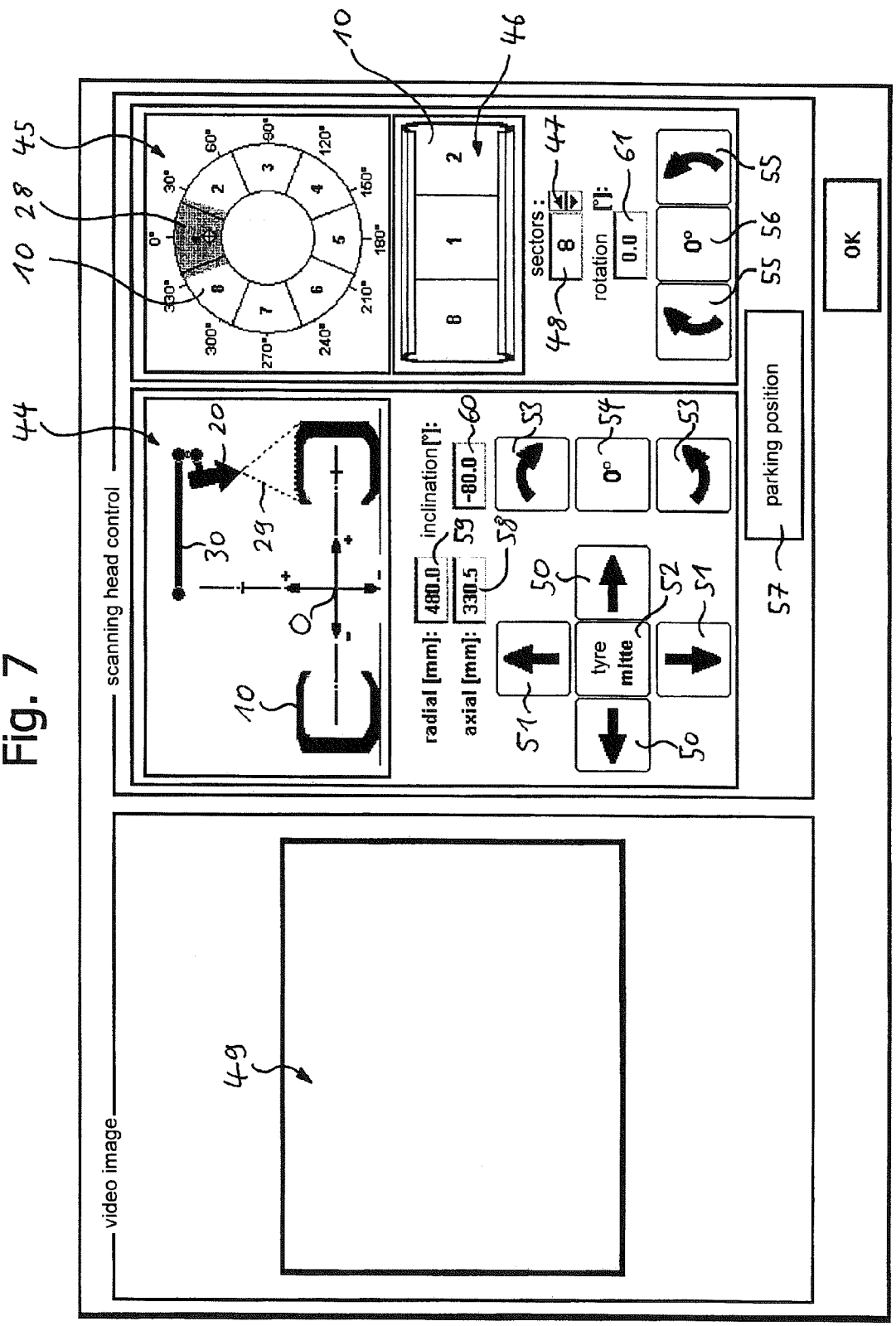
FIG. 7 is an illustration as shown in FIG. 3 showing the scanning head in a third viewing position.
Figure 8:
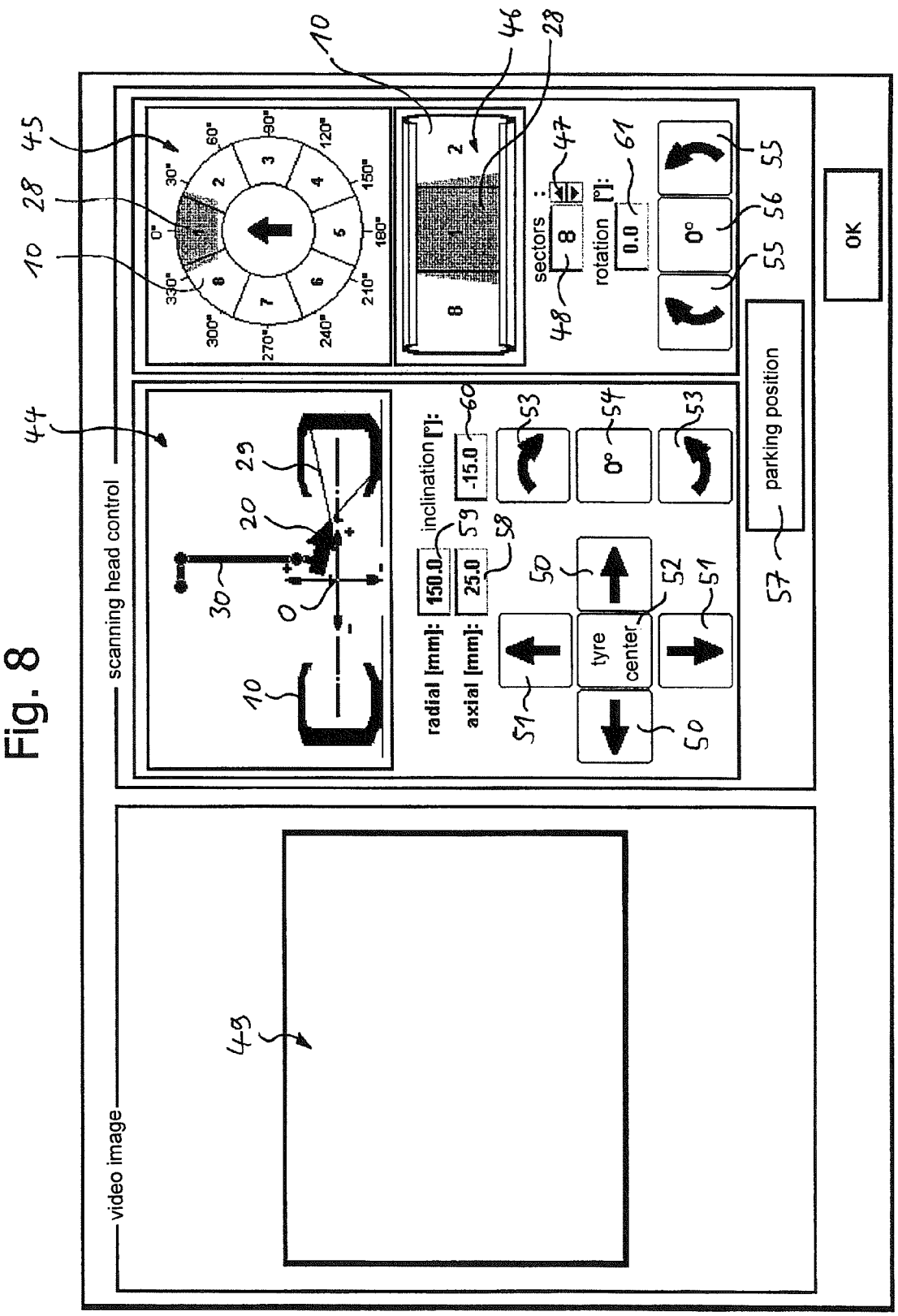
FIG. 8 is an illustration as shown in FIG. 3 showing the scanning head in a fourth viewing position.

The viewing position of the scanning head 20 as shown in FIG. 4 differs from the viewing position as shown in FIG. 3 in that the axial offset a is zero. The upper bead 15 of the tire 10 is now totally in the scan of scanning head 20. The illustration in FIGS. 5 and 6 differs from that in FIG. 4 by the number of sectors. The display field 46 in FIG. 5 makes it evident that with a number of 6 sectors the field of view 28 is smaller than a sector so that the sector is not fully scanned by the scanning head 20, whereas display field 46 in FIG. 6 makes it obvious that with a number of ten sectors the field of view 28 is significantly larger than the sector, resulting in an overlap portion which although permitting a redundant scan, adds to the time needed to fully test the tire 10. The display field 46 thus contributes towards adapting in an iterative process the number of sectors to the field of view 28 depending mainly on the viewing position and viewing direction of the scanning head 20. The same applies when the scanning head, as shown in FIG. 7 is oriented at a sidewall shot or as shown in FIG. 8 at a so-called split-crown shot, i.e. a positioning of the scanning head 20 in which the field of view 28 scans just one of the two beads of the tire 10. In the sidewall shot as shown in FIG. 7 the viewing position of the scanning head 20 in the display field 45 is not indicated by an arrow but by a marking symbolizing the radial location of the scanning head 20.

Figure 9:
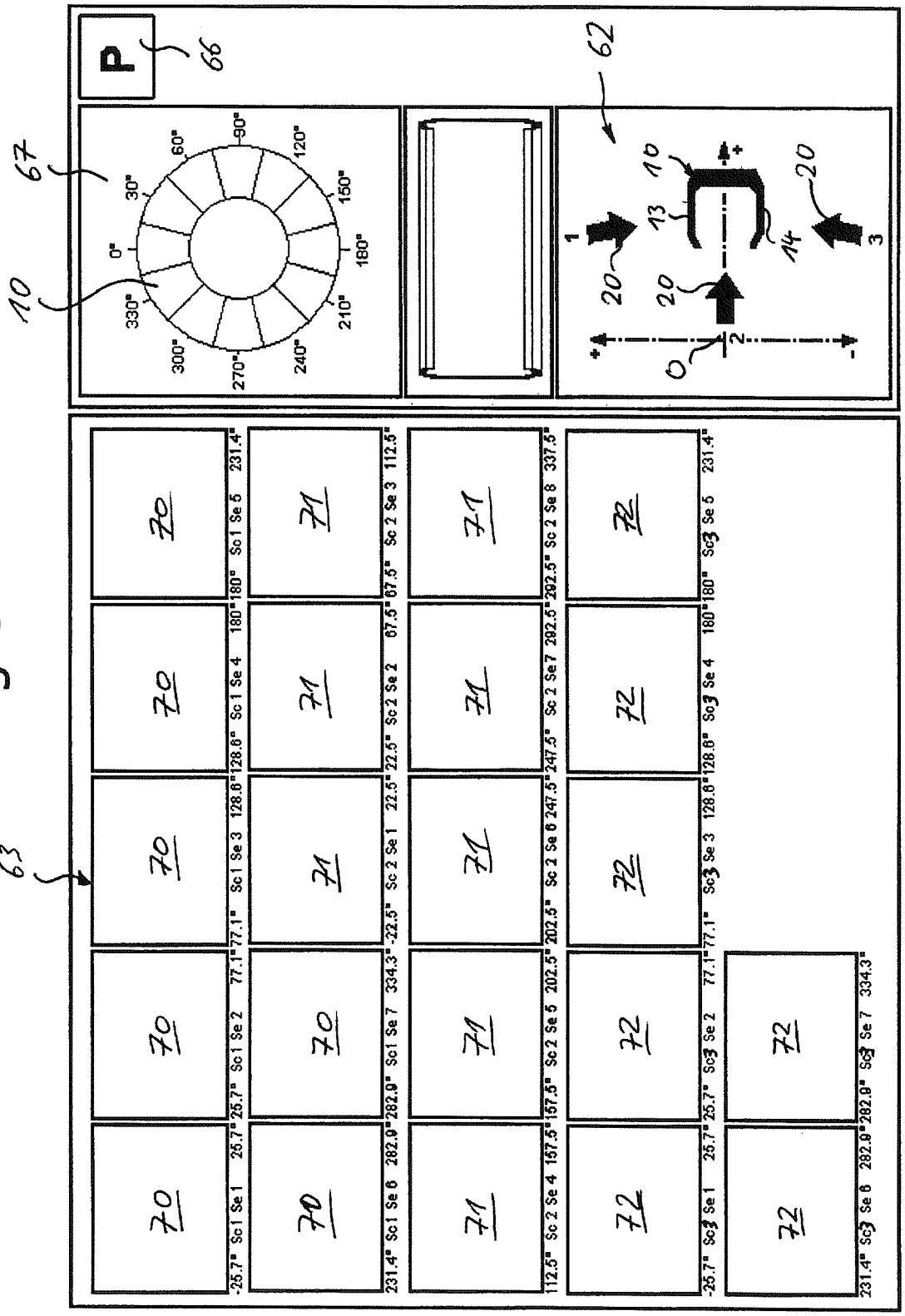
FIG. 9 is an illustration in the control and display means showing the scan images of three implemented scans.

Referring now to FIG. 9 there is illustrated a second user interface of the control and display means 40 comprising in this case a display field 63 for displaying a series of scan images 70, 71, 72 obtained during a full rotation of the scanning head 20 relative to the tire 10 in the corresponding sectors. The user interface features furthermore a display field 62 for displaying the viewing position and viewing direction as applicable to the scanning head 20 in obtaining the scan images 70, 71, 72. The display field 62 indicates the system of coordinates, a cross-section through the tire 10 as well as arrows symbolizing the viewing position and viewing direction of the scanning head 20. In the example aspect as shown in FIG. 9 three arrows are evident, one of which points to the upper sidewall 13 of the tire 10 in a sidewall shot performed during a first scan, another arrow pointing at a crown shot performed during a second scan and the last arrow symbolizing a sidewall shot of the lower sidewall 14 of the tire 10 performed during a third scan. The scan images 70, 71, 72 taken during these scans in the corresponding sectors are displayed in the display field 63. The display field 63 furthermore makes it evident that the number of sectors during the first and third scan amounted to seven in thus producing seven scan images 70, 72, whereas the number of sectors during the second scan amounted to eight, resulted in eight scan images 71. Displayed, in addition, in display field 63 is the assignment of the scan images 70, 71, 72 to the corresponding sector of each scan.

Figure 10:
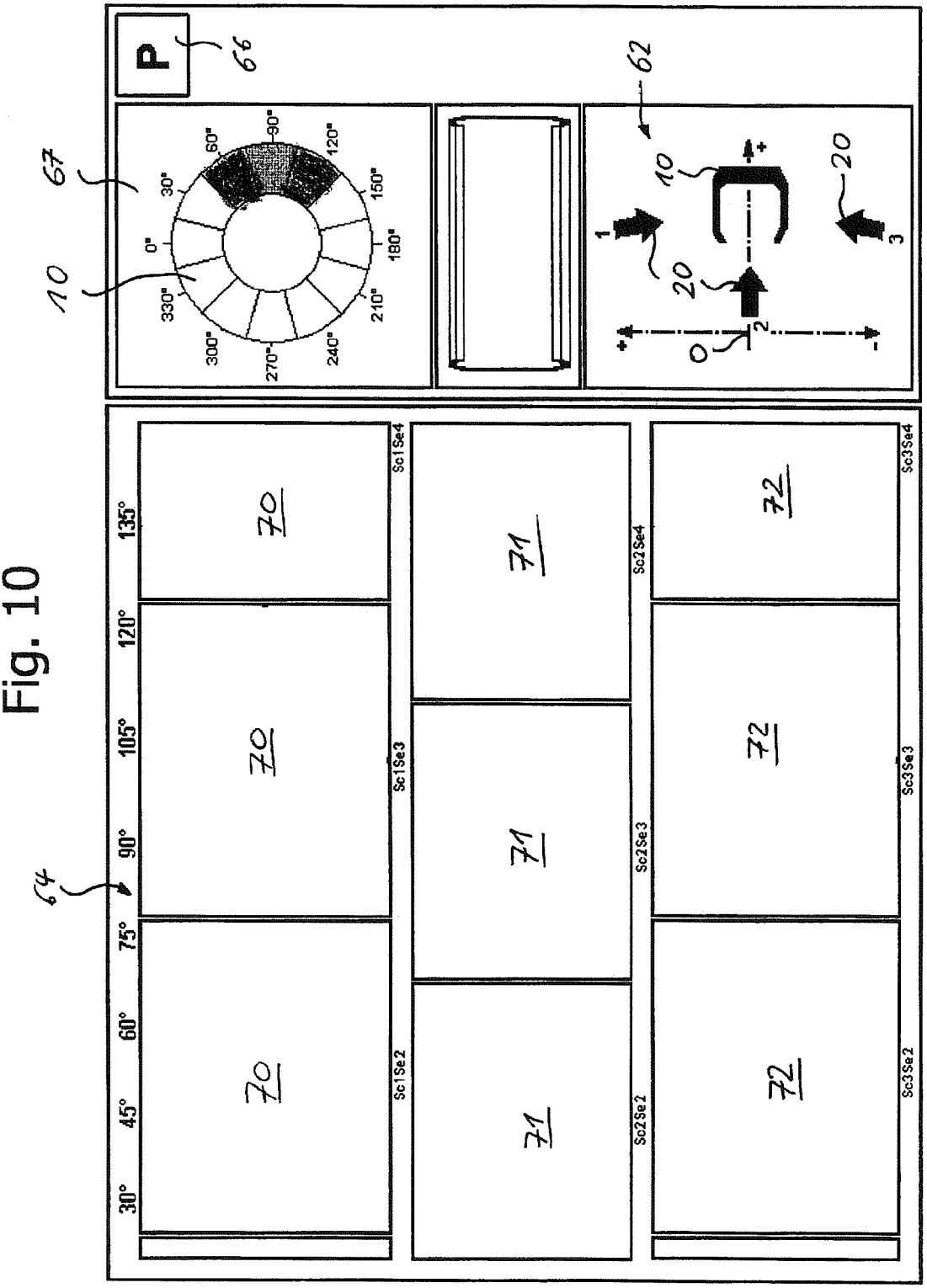
FIG. 10 is an illustration in the control and display means showing the scan images in a selected detail.
Figure 11:
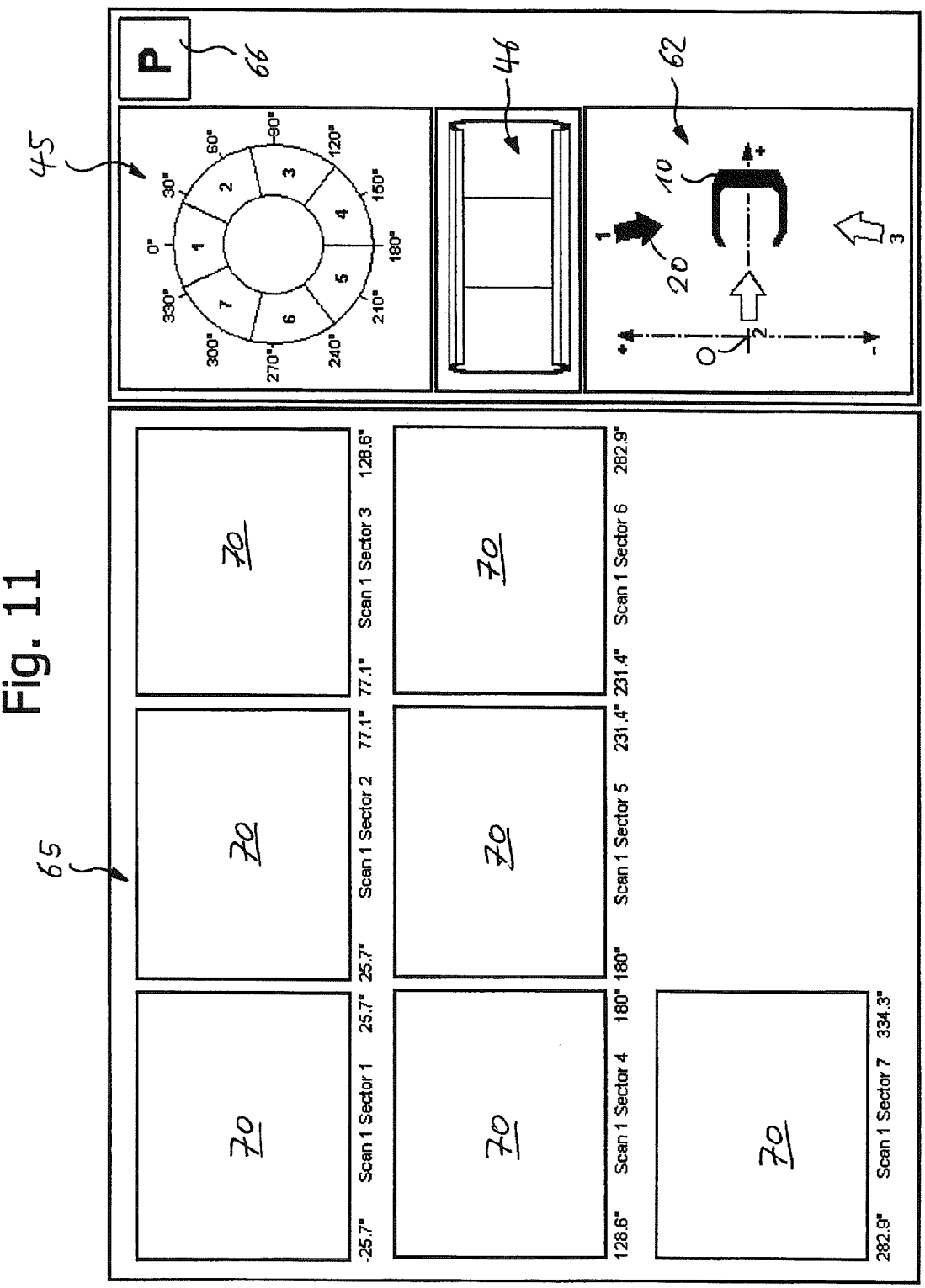
FIG. 11 is an illustration as shown in FIG. 9 showing the scan images of the first scan.
Figure 13:
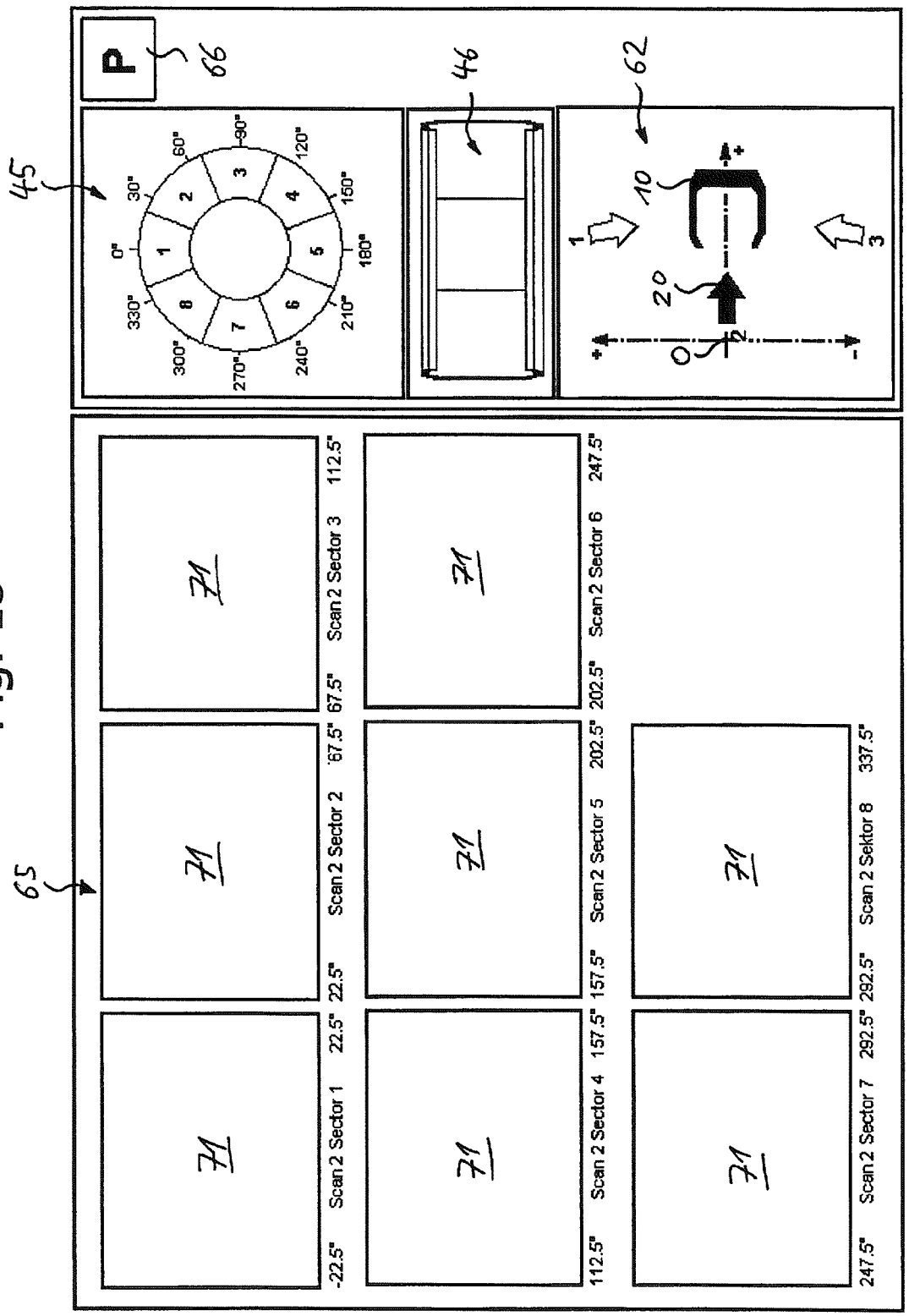
FIG. 13 is an illustration as shown in FIG. 11 showing the scan images of the second scan.

The user interface features in addition, a display field 67, similar to display field 45, for displaying a top-down view of the tire 10, but unlike display field 45 showing not the sectors relative to a scanning portion but a portioning of the tire 10 into equal sections. The display field 67 doubles as a user field permitting selection of a detail comprising one or more of these sections so as to display exclusively the sectors involved in this detail in a display field 64 as evident from FIG. 10. Depending on the particular application concerned the display field 62 may double as a user field for selecting a single scan and displaying the corresponding scan images 70, 71 in the selected scan as evident from FIGS. 11 and 13. The FIGS. 11 and 13 also make it evident how the selected scan is highlighted in the display field 62.

Figure 12:
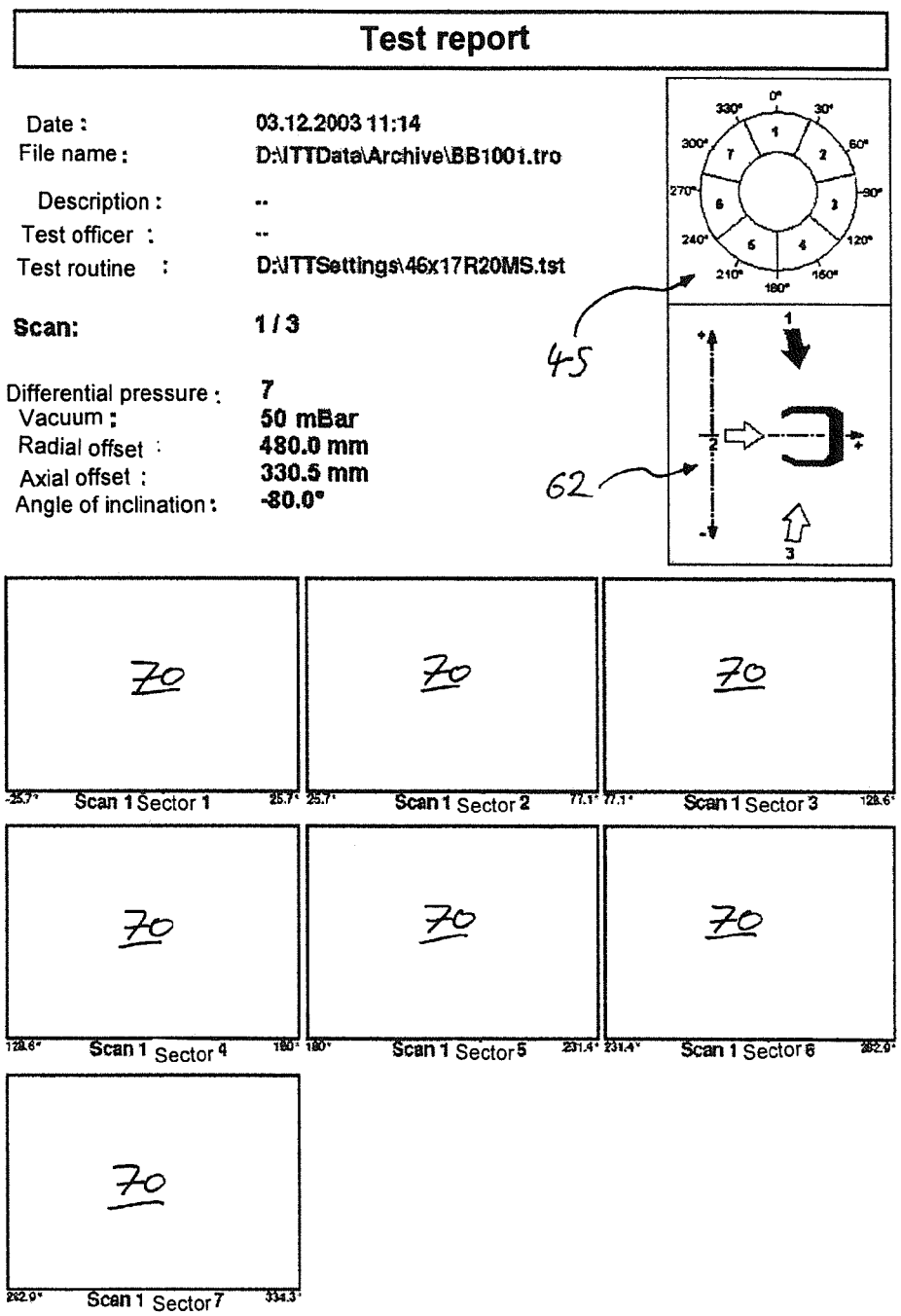
FIG. 12 is an illustration of a test report as to the scan images as shown in FIG. 11.

The second user interface of the control and display means 40 comprises furthermore a user field 66 for generating a test report documenting the resulting scan as shown in FIG. 12, the test report including the scans of the display fields 45 and 62.

Figure 14:
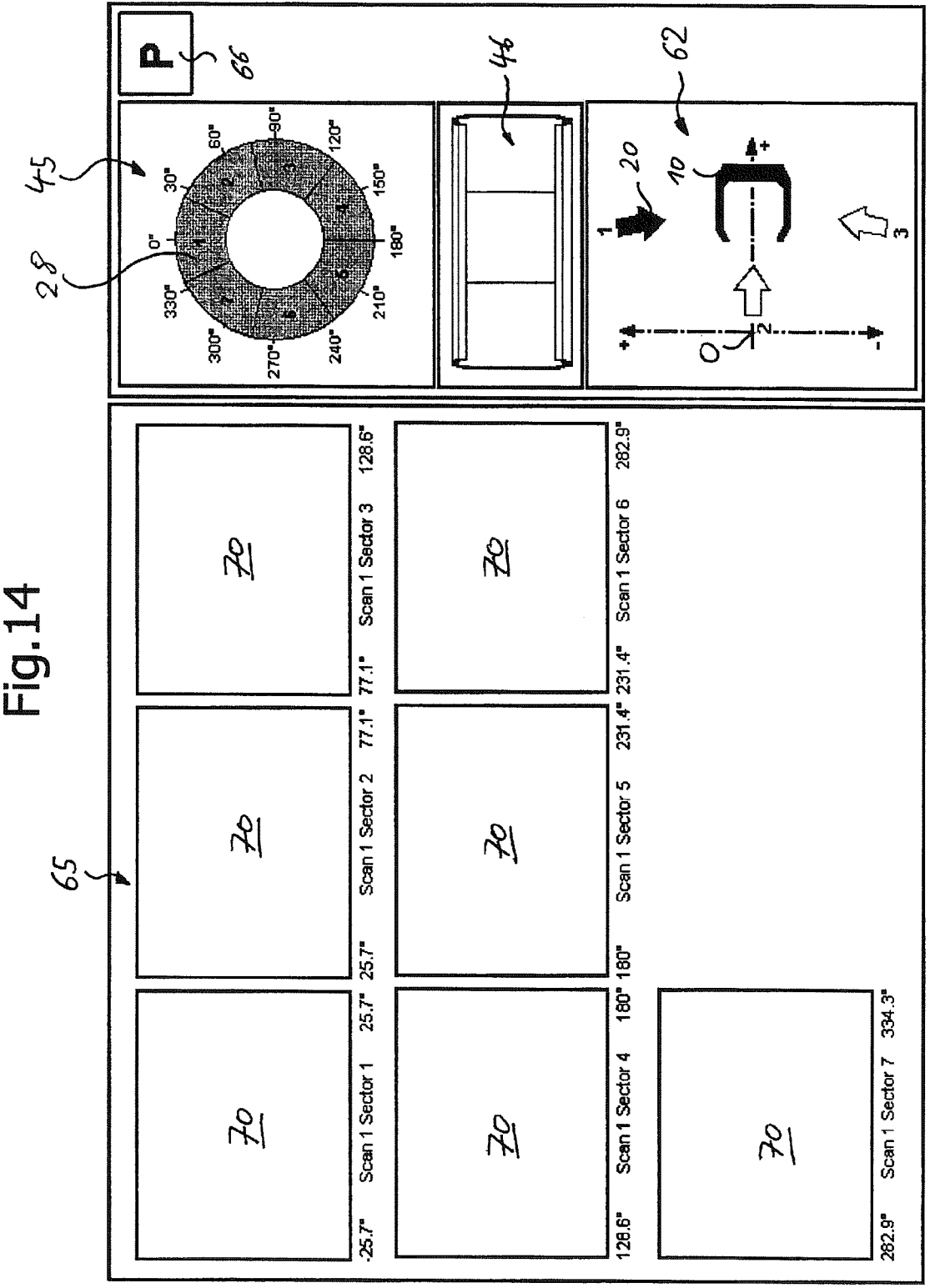
FIG. 14 is an illustration as shown in FIG. 11 showing the field of view of the scanning head relative to the tire.
Figure 15:
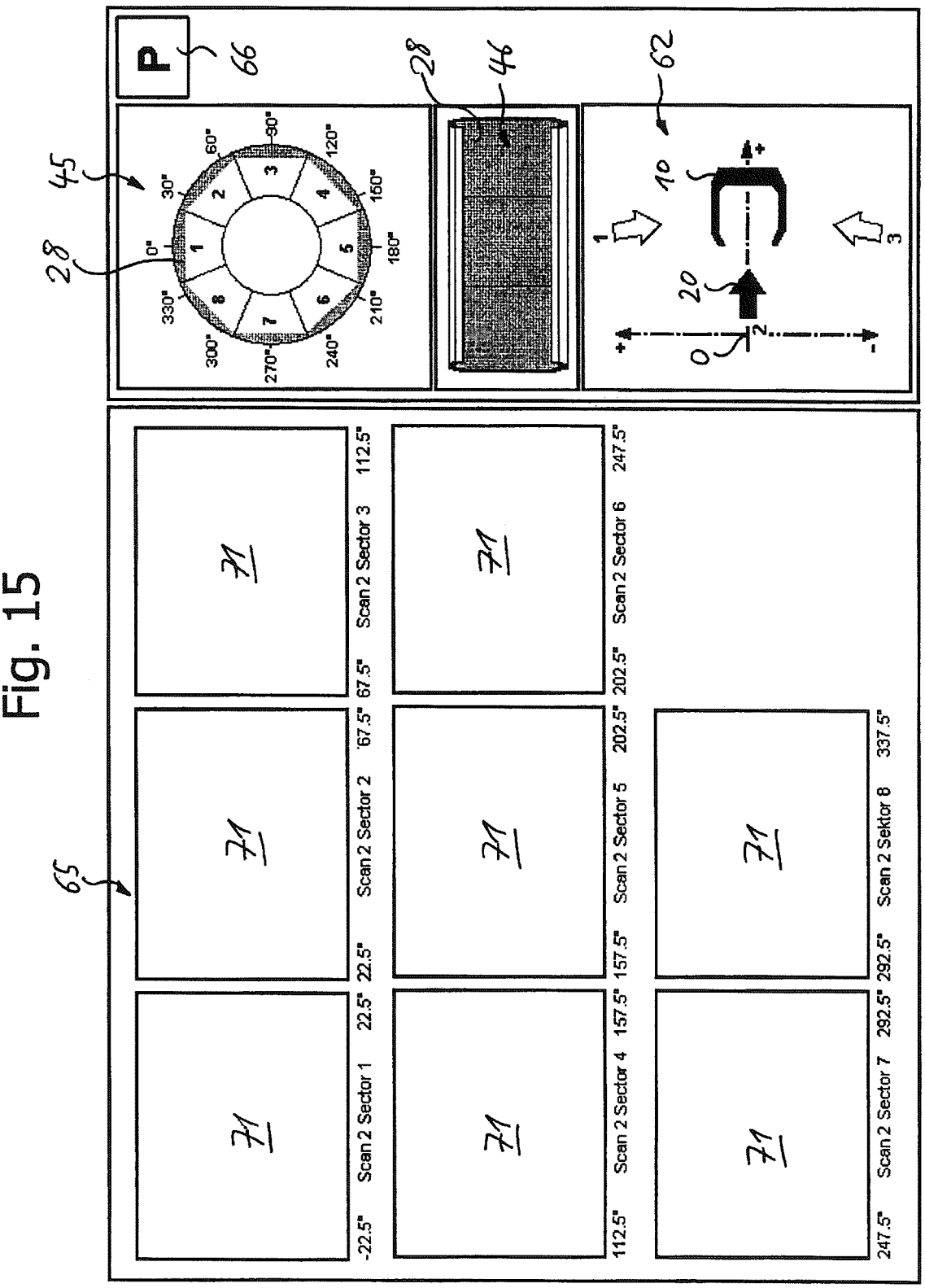
FIG. 15 is an illustration as shown in FIG. 13 showing the field of view of the scanning head relative to the tire.
Figure 16:
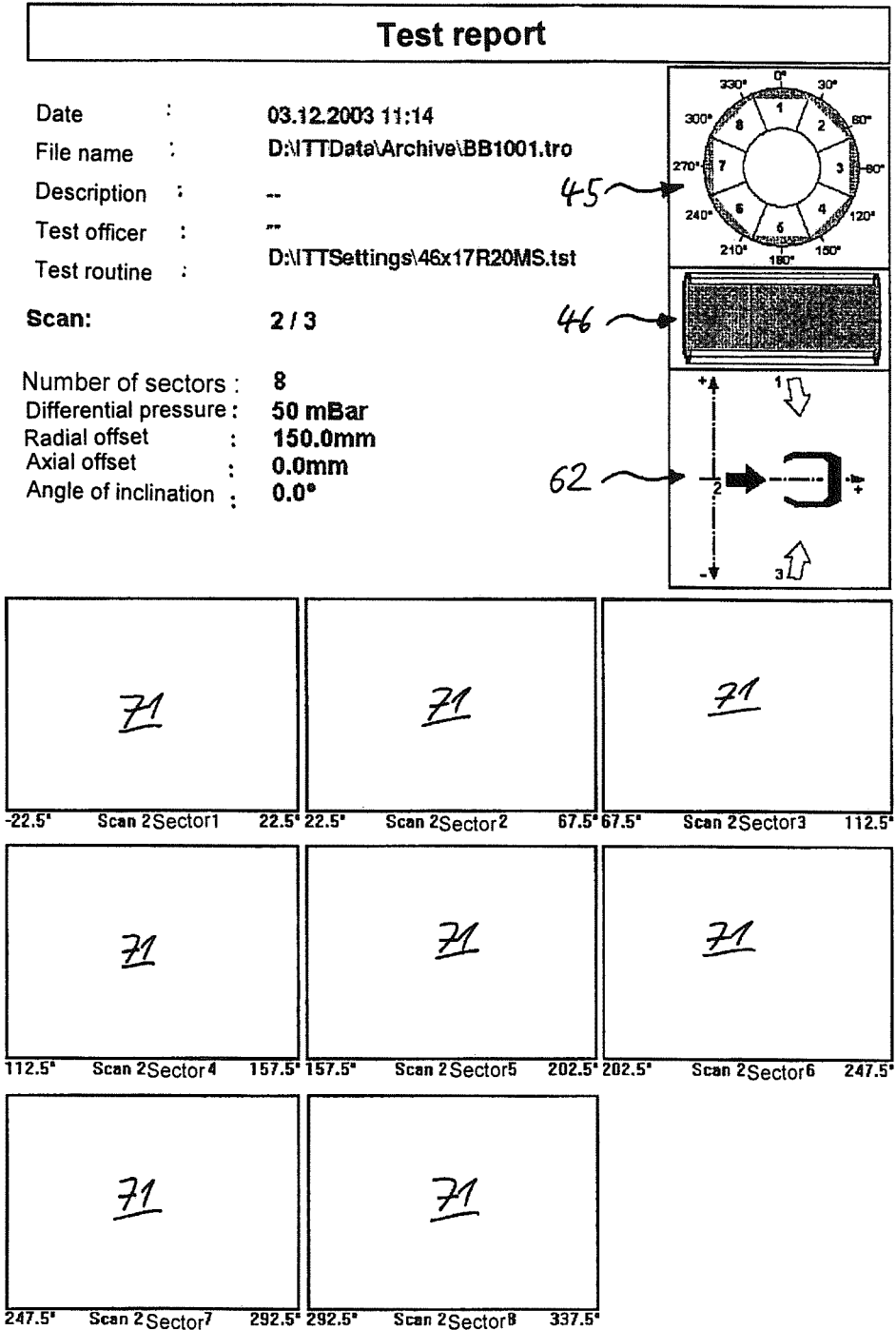
FIG. 16 is an illustration of a resulting scan as to the scan images as shown in FIG. 15.

Referring now to FIGS. 14 to 16 there is illustrated how in an alternative aspect of the second user interface of the control and display means 40 the field of view 28 is displayed additionally in the display fields 45, 46. In this case the test report additionally includes the scan from display field 46.

Figure 17:
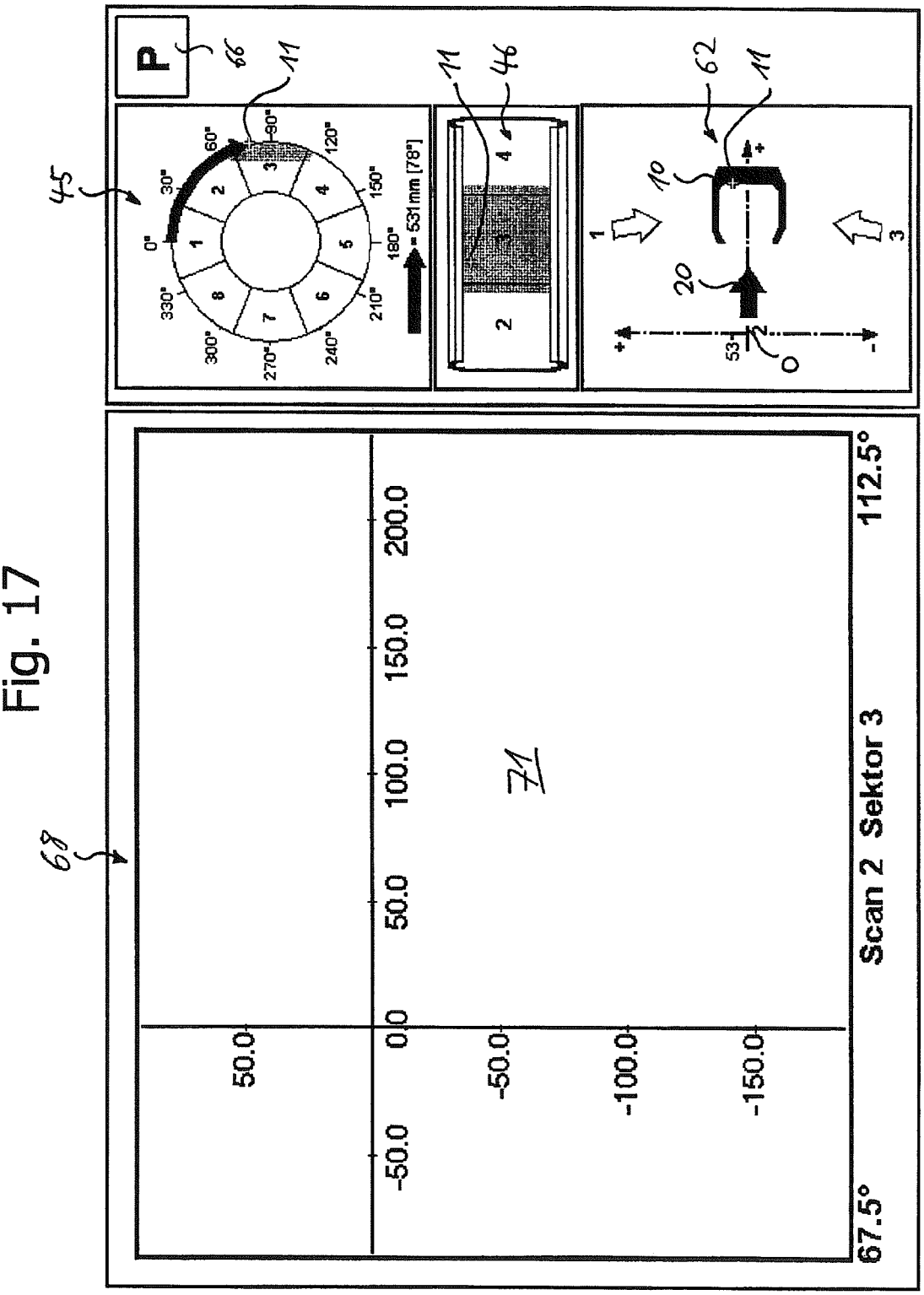
FIG. 17 is an illustration of the control and display means showing the scan image obtained during the second scan in the third sector as well as the location of a flaw.
Figure 18:
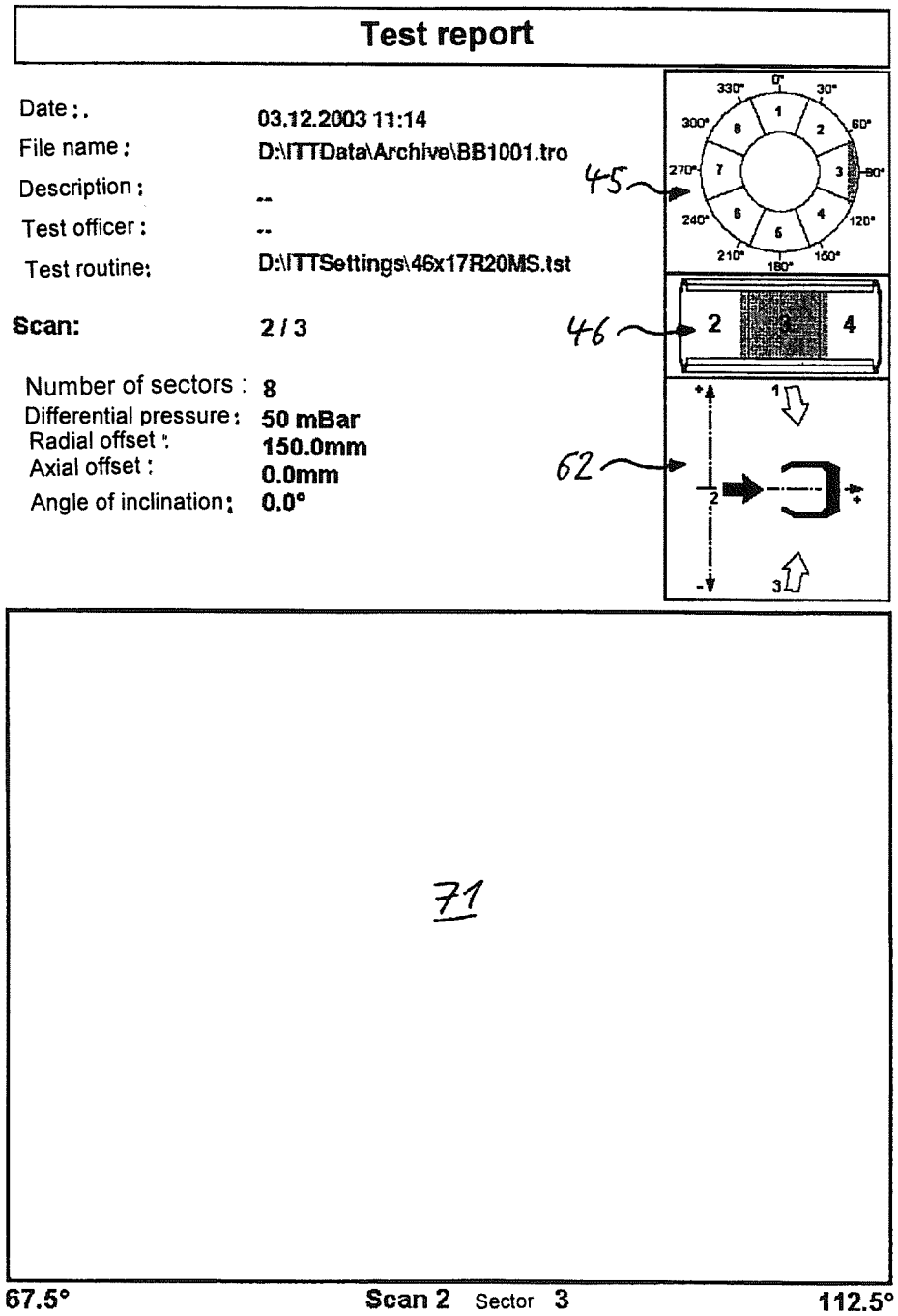
FIG. 18 is an illustration of a test report as to the scan image as shown in FIG. 17.

Referring now to FIG. 17 there is illustrated a third user interface of the control and display means 40. In this case the user interface comprises in addition to the display fields 45, 46 and 62 also a display field 68 for displaying the scan image assigned to a sole sector. In the example aspect as shown in FIG. 17 the scan image 71 obtained during the second scan in the third sector is displayed, the associated scan and the sector concerned also being displayed in the display fields 45, 46 and 62. Indicated furthermore in display field 68 is a reticule which can be freely positioned in the display field 68 so that the origin of the reticule can be located on a flaw 11 to localize the position of the flaw 11. In this case the size of the flaw 11 can also be read off by means of the coordinate axes. The reticule and thus the location of the flaw 11 is displayed, in addition, in the display fields 45, 46 and 62, the display field 45 displaying furthermore the arc length relative to the outer diameter of the tire 10 by which the flaw 11 is distanced from the 0° location of the tire 10, for example the DOT number. The third user interface of the control and display means 40 features in addition, the user field 66 for generating a test report as shown in FIG. 18 including the scan images from the display fields 45, 46 and 62 and, where necessary, also showing the location of the flaw 11.

Although the user interfaces of the control and display means 40 as described above are configured as a graphics user surface in the example aspect described in thus having the advantage that the display fields 44 to 46, 48, 58 to 65 and 67, 68 of doubling as user fields by simple ways and means, it is, of course, just as possible to also realize separate displays and switches depending on the particular application concerned. No matter how the user interface is realized technically the control and display means 40 ensures simple control of the scanning head 20 and reliable analysis of the scan existing by way of scan images 70, 71, 72.

LIST OF REFERENCE NUMERALS

10 tire
11 flaw
12 tread
14 sidewall
15 bead
20 scanning head
21 camera
22 objective lens
23 laser diode
24 objective lens
25 beam splitter
26 moveable mirror
27 stationary mirror
28 field of view
29 angle of view
30 positioning means
31 positioner
32 positioner
33 positioner
40 control and display means
41 computer
42 input device
43 monitor
44 display/user field
45 display/user field
46 display/user field
47 input device
48 display/user field
49 display field
50 user field
51 user field
52 user field
53 user field
54 user field
55 user field
56 user field
57 user field
58 display/user field
59 display/user field
60 display/user field
61 display/user field
62 display/user field
63 display/user field
64 display/user field
65 display/user field
66 user field
67 display/user field
68 display/user field
70 scan image
71 scan image
72 scan image
0 origin of the system of coordinates
DOT production date
MBE machine basis plane
RME tire centerplane
B width of tire
D diameter of tire
H main point
M rim width
P parking position
R axis of rotation
S pivoting axis
a axial offset
r radial offset
x horizontal direction
y horizontal direction
z vertical direction
α angle of inclination
ø angle of rotation

The invention claimed is:

1. A device for testing a tire, particularly by interferometric scanning, comprising:
   a scanning head for scanning the tire to obtain a resulting scan;
   a positioning means for positioning the scanning head in a viewing position and orienting it in a viewing direction;
   a control and display means for controlling the positioning means and displaying the resulting scan; and
   in which the control and display means comprises at least one display field in addition to the display of the scan for symbolically displaying the viewing position or the viewing direction of the scanning head relative to the tire;
   wherein the control and display means comprises at least one user field for entering the spatial offset of the scanning head in the axial direction or the spatial offset of the scanning head in the radial direction or the angle of rotation of the scanning head relative to the tire or the angle of inclination of the scanning head caused by it being pivoted about the pivoting axis.

2. The device as set forth in claim 1, in which the scanning head is provided with a camera and preferably has a field of view.

3. The device as set forth in claim 2, in which displayable in the display field is the field of view or an angle of view characterizing the field of view relative to the tire.

4. The device as set forth in claim 1, characterized by a display field for displaying the viewing position or the viewing direction of the scanning head relative to a cross-section through the tire.

5. A method for testing a tire, particularly by means of interferometric scanning comprising the following steps:
   positioning a scanning head by means of a positioning means in a viewing position and orienting it in a viewing direction;

scanning the tire by means of the scanning head to produce a resulting scan; and controlling the positioning means and displaying the resulting scan by means of a control and display means in which in addition to displaying the resulting scan, the viewing position or the viewing direction of the scanning head with respect to the tire is symbolically displayed by means of at least one display field of the control and display means;

wherein the spatial offset of the scanning head in the axial direction or the spatial offset of the scanning head in the radial direction or the angle of rotation of the scanning head relative to the tire or the angle of inclination of the scanning head prompted by a pivoting about the pivoting axis is entered by means of at least one user field of the control and display means.

6. The device as set forth in claim 2, in which the control and display means comprises a third display field for displaying the field of view relative to a segment of the tire.

7. The device as set forth in claim 1, in which the control and display means comprises an entry field for entering a number of sectors sectioning the tire into discrete scan sections, the number of sectors preferably being displayable in a display field.

8. The device as set forth in claim 7, in which the sectors are displayable in the second display field or in the third display field.

9. The device as set forth in claim 8, in which the angle including the sectors or the length of the arc corresponding to the angle is displayable in the second display field or in the third display field.

10. The device as set forth in claim 1, in which by means of the positioning means:
the scanning head is moveable in an axial direction:
the scanning head is moveable in a radial direction;
the scanning head and the tire are rotatable relative to each other about a rolling axis extending in the axial direction; or
the scanning head is rotatable about a pivoting axis oriented orthogonal to the rolling axis.

11. The device as set forth in claim 10, in which the control and display means comprises at least one display field for displaying the spatial offset of the scanning head in the axial direction or the spatial offset of the scanning head in the radial direction or the angle of rotation of the scanning head relative to the tire or the angle of inclination of an inclination of the scanning head caused by it being pivoted about the pivoting axis.

12. The device as set forth in claim 10, in which the spatial offset of the scanning head in the axial direction and the spatial offset of the scanning head in the radial direction is enterable or displayable by means of coordinates of a system of coordinates, the origin of which is located in the intersection of rolling axis and a tire centerplane.

13. The device as set forth in claim 10, in which the angle of rotation of the scanning head is enterable or displayable relative to a predefined identification marking of the tire, preferably a number indicating the production date of the tire.

14. The device as set forth in claim 2 in which the control and display means comprises a display field for displaying the image captured by the camera.

15. The device as set forth in claim 1 in which the resulting scan is at least one scan image, the control and display means comprising at least one display field for displaying the scan image.

16. The device as set forth in claim 15, characterized by a display field for displaying at least one series of scan images obtained during a complete rotation of the scanning head relative to the tire in the corresponding sectors.

17. The device as set forth in claim 15, characterized by a display field for displaying at least one series of scan images obtained in the corresponding sectors of a predefined detail.

18. The device as set forth in claim 17, characterized by a display field for displaying the detail relative to a top-down view of the tire.

19. The device as set forth in claim 15, in which the control and display means comprises at least a display field assigned to the scan image for displaying the viewing position or viewing direction which the scanning head has in generating the scan image.

20. The device as set forth in claim 1, in which in the display field the location of a detected flaw of the tire is displayable.

21. The device as set forth in claim 1, in which the control and display means comprises a user field for generating a test report documenting the resulting scan.

22. The device as set forth in claim 1, in which the control and display means comprises a computer, an input device and a monitor.

23. The device as set forth in claim 2, in which the scanning head comprises an illuminator for illuminating the tire and a shearing element for rendering the light beams reflected from the tire into an interference pattern, the camera being provided with an objective lens arranged to focus the interfering light beams in the beam path of the shearing element.

24. A method for testing a tire, particularly by means of interferometric scanning comprising the following steps:
positioning a scanning head by means of a positioning means in a viewing position and orienting it in a viewing direction;
scanning the tire by means of the scanning head to produce a resulting scan; and
controlling the positioning means and displaying the resulting scan by means of a control and display means in which in addition to displaying the resulting scan, the viewing position or the viewing direction of the scanning head with respect to the tire is symbolically displayed by means of at least one display field of the control and display means;
wherein the spatial offset of the scanning head in the axial direction or the spatial offset of the scanning head in the radial direction of the angle of rotation of the scanning head relative to the tire or the angle of inclination of the scanning head prompted by a pivoting about the pivoting axis is entered by means of at least one user field of the control and display means.

25. The method as set forth in claim 24, in which in the display field the field of view of the scanning head or an angle of view characterizing the field of view is displayed relative to the tire.

26. The method as set forth in claim 24, in which in a first display field the viewing position or the viewing direction of the scanning head is displayed relative to a cross-section through the tire.

27. The method as set forth in claim 24, in which in a second display field the viewing position or the viewing direction of the scanning head is displayed relative to a top-down view of the tire.

28. The method as set forth in claim 25, in which in a third display field of the control and display means the field of view is displayed relative to a segment of the tire.

29. The method as set forth in claim 24, in which in an entry field of the control and display means a number of sectors sectioning the tire into discrete scan sections is entered, the number of sectors preferably being displayed in a display field.

29. The method as set forth in claim 29, in which the sectors are displayed in the second display field or in the third display field.

31. The method as set forth in claim 30, in which the angle including the sectors or the length of the arc corresponding to the angle is displayed in the second display field or in the third display field.

32. The method as set forth in claim 24, in which:
the scanning head is moved by means of the positioning means in an axial direction;
the scanning head is moved by means of the positioning means in a radial direction:
the scanning head and the tire are rotated by means of the positioning means relative to each other about a rolling axis extending in the axial direction; or
the scanning head is rotated by means of the positioning means about a pivoting axis oriented orthogonal to the rolling axis.

33. The method as set forth in claim 32, in which the spatial offset of the scanning head in the axial direction or the spatial offset of the scanning head in the radial direction or the angle of rotation of the scanning head relative to the tire or the angle of inclination of the scanning head prompted by a pivoting about the pivoting axis is displayed by means of at least one display field of the control and display means.

34. The method as set forth in claim 32, in which the spatial offset of the scanning head in the axial direction or the spatial offset of the scanning head in the radial direction is entered or displayed by means of coordinates of a system of coordinates the origin of which is located in the intersection of rolling axis and a tire centerplane.

35. The method as set forth in claim 32, in which the angle of rotation of the scanning head relative to a predefined identification marking of the tire, preferably to a number indicating the production date of the tire is entered or displayed.

36. The method as set forth in claim 25, in which the image taken by the camera is displayed by means of a display field 49 of the control and display means.

37. The method as set forth in claim 24, in which the resulting scan is represented by at least one scan image, the scan image being displayed by means of at least one display field of the control and display means.

38. The method as set forth in claim 37, in which at least one series of scan images obtained during a complete rotation of the scanning head relative to the tire in the corresponding sectors is displayed by means of a display field.

39. The method as set forth in claim 37, in which at least one series of scan images obtained in the corresponding sectors of a predefined detail is displayed by means of a display field.

40. The method as set forth in claim 39, in which the section relative to a top-down view of the tire is displayed by means of a display field.

41. The method as set forth in claim 37, in which the viewing position or the viewing direction of the scanning head in generating the scan image is displayed by means of at least one display field of the control and display means assigned to the scan image.

42. The method as set forth in claim 24, in which in the display field the location of a detected flaw of the tire is displayed.

43. The method as set forth in claim 24, in which a test report documenting the scan image is generated by means of a user field of the control and display means.

44. The method as set forth in claim 24, in which in a test report documenting the scan image at least one display field for displaying the viewing position or the viewing direction or the field of view or the angle of view of the scanning head relative to the tire is imaged.

45. The method as set forth in claim 25, in which the tire is illuminated by means of an illuminator of the scanning head, the light beams reflected by the tire are rendered by means of a shearing element of the scanning head into an interference pattern and the interfering light beams are imaged by means of an objective lens of the camera arranged in the beam path of the shearing element.

46. A user interface for a control and display means for controlling the positioning means of a device as set forth in claim 1 or for displaying the resulting scan obtained from the scanning head of the device, characterized by at least one display field for displaying the viewing position or viewing direction of the scanning head relative to the tire.

47. The user interface as set forth in claim 46, characterized by a display field, an entry field or a user field as set forth in claim 3.

48. A test report for documenting a resulting scan obtained by the method as set forth in claim 24, characterized by documenting the viewing position or viewing direction or the field of view or angle of view of the scanning head relative to the tire.

* * * * *

UNITED STATES PATENT AND TRADEMARK OFFICE
CERTIFICATE OF CORRECTION

Page 1 of 2

PATENT NO. : 8,614,740 B2
APPLICATION NO. : 12/294721
DATED : December 24, 2013
INVENTOR(S) : Bernward Mähner It is certified that error appears in the above-identified patent and that said Letters Patent is hereby corrected as shown below:

In the Specification

In Column 2,
Line 4, kindly delete the redundant instance of "that".
Line 13, kindly delete "tyre".
Line 19, kindly delete "tyre".

In Column 3,
Line 5, please replace "and" with --;--.
Line 7, following the term "display means" kindly insert --; and--.

In Column 7,
Line 40, kindly replace the phrase "in an viewing direction" with --in a viewing direction--.

In Column 8,
Line 8, following "where" kindly delete "a".
Line 53, replace the expression "height to with" with --height to width--.
Line 65, kindly change "a regards" to --as regards--.

In Column 9,
Line 16, kindly change the term "a entry field" to --an entry field--.

In the Claims

In Column 12, Lines 63-67, kindly delete claim 5 and substitute therefor:
      --5. The device as set forth in claim 1, characterized by a second display field for displaying the viewing position or viewing direction of the scanning head relative to the top-down view of the tire.--

Signed and Sealed this
Twenty-fourth Day of June, 2014

Michelle K. Lee
*Deputy Director of the United States Patent and Trademark Office*

In Column 14, Claim 24,
Line 46, kindly replace the phrase in the fifth to last line of claim 24 reading "radial direction of the angle of rotation" with the phrase --radial direction or the angle of rotation--.